(12) United States Patent
Ishikawa et al.

(10) Patent No.: US 6,804,613 B2
(45) Date of Patent: Oct. 12, 2004

(54) ELECTROMAGNETIC FLOWMETER

(75) Inventors: Ikuhiko Ishikawa, Musashino (JP); Hironobu Oota, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 42 days.

(21) Appl. No.: 10/246,479

(22) Filed: Sep. 19, 2002

(65) Prior Publication Data

US 2003/0051557 A1 Mar. 20, 2003

(30) Foreign Application Priority Data

Sep. 20, 2001 (JP) .................................... 2001-286778

(51) Int. Cl.[7] .......................... G01F 1/00; G01F 19/00; G06F 17/00
(52) U.S. Cl. ............................ 702/45; 702/12; 702/49; 702/64; 702/65; 702/76; 702/104; 702/189; 73/198; 73/861; 324/439; 141/94; 427/74; 427/517
(58) Field of Search ............................. 702/12, 45, 49, 702/64–65, 76, 104, 189; 73/198, 861; 324/439; 141/94; 427/74, 517

(56) References Cited

U.S. PATENT DOCUMENTS

| | | | | |
|---|---|---|---|---|
| 4,434,666 A | * | 3/1984 | Hemp et al. | 73/861.12 |
| 4,648,279 A | * | 3/1987 | Milsch et al. | 73/861.17 |
| 5,458,003 A | * | 10/1995 | Ishihara et al. | 73/861.12 |
| 5,866,823 A | * | 2/1999 | Scarpa | 73/861.16 |
| 5,880,376 A | * | 3/1999 | Sai et al. | 73/861.08 |
| 6,435,036 B1 | * | 8/2002 | Sakai et al. | 73/861.22 |
| 6,530,402 B2 | * | 3/2003 | Suzuki et al. | 141/94 |
| 6,644,127 B1 | * | 11/2003 | Matzen | 73/861.12 |

FOREIGN PATENT DOCUMENTS

| | | |
|---|---|---|
| JP | 8-29223 | 2/1996 |
| JP | 9-502267 | 3/1997 |
| JP | 2880830 | 1/1999 |
| JP | 3018310 | 1/2000 |

* cited by examiner

*Primary Examiner*—John Barlow
*Assistant Examiner*—Aditya Bhat
(74) *Attorney, Agent, or Firm*—Westerman, Hattori, Daniels & Adrian, LLP

(57) ABSTRACT

The present invention is intended to achieve measurement of electrode impedance that is not easily affected by fluid noise, and to accurately detect adhesion and discriminate the type of fluid.

An electromagnetic flowmeter that is provided with a pipe through which the fluid to be measured is passed, applies a magnetic field to the above fluid driving the excitation coils using the excitation circuit, and thereby measures the flow rate of the fluid passing through the above-mentioned pipe; further comprising:

a pair of detecting electrodes that detect the flow signal corresponding to the flow rate of the fluid passing through the above-described pipe, an earth electrode whose potential becomes the reference potential when the flow rate is measured, diagnosing signal generators that apply the diagnosing signals between the above detecting electrodes and the above earth electrode, and a diagnosis circuit to detect the resistance values between the above detecting electrodes and the above earth electrode as diagnostic signals.

23 Claims, 18 Drawing Sheets

FIG.3
(a)
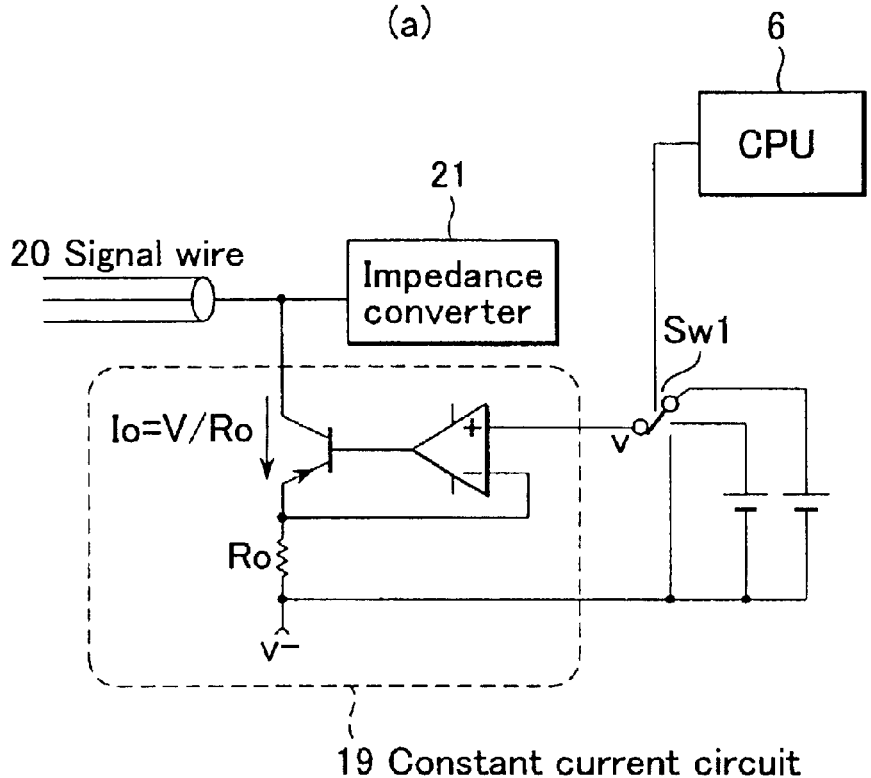
(b)
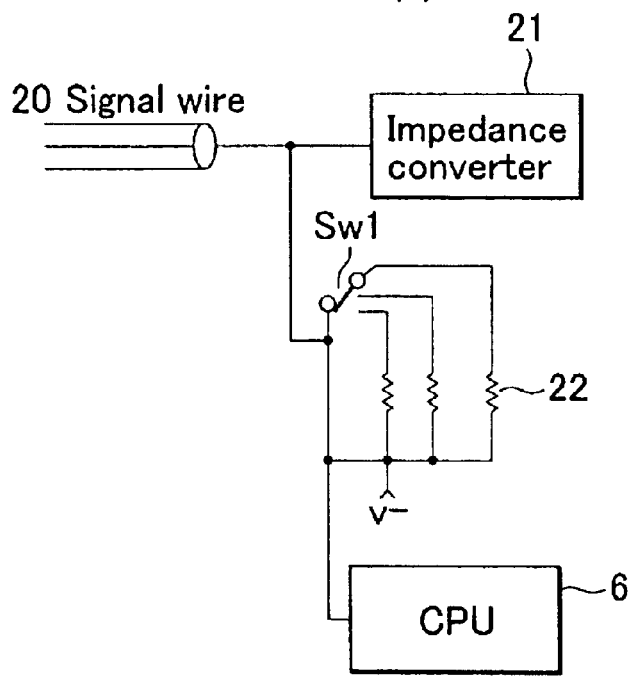

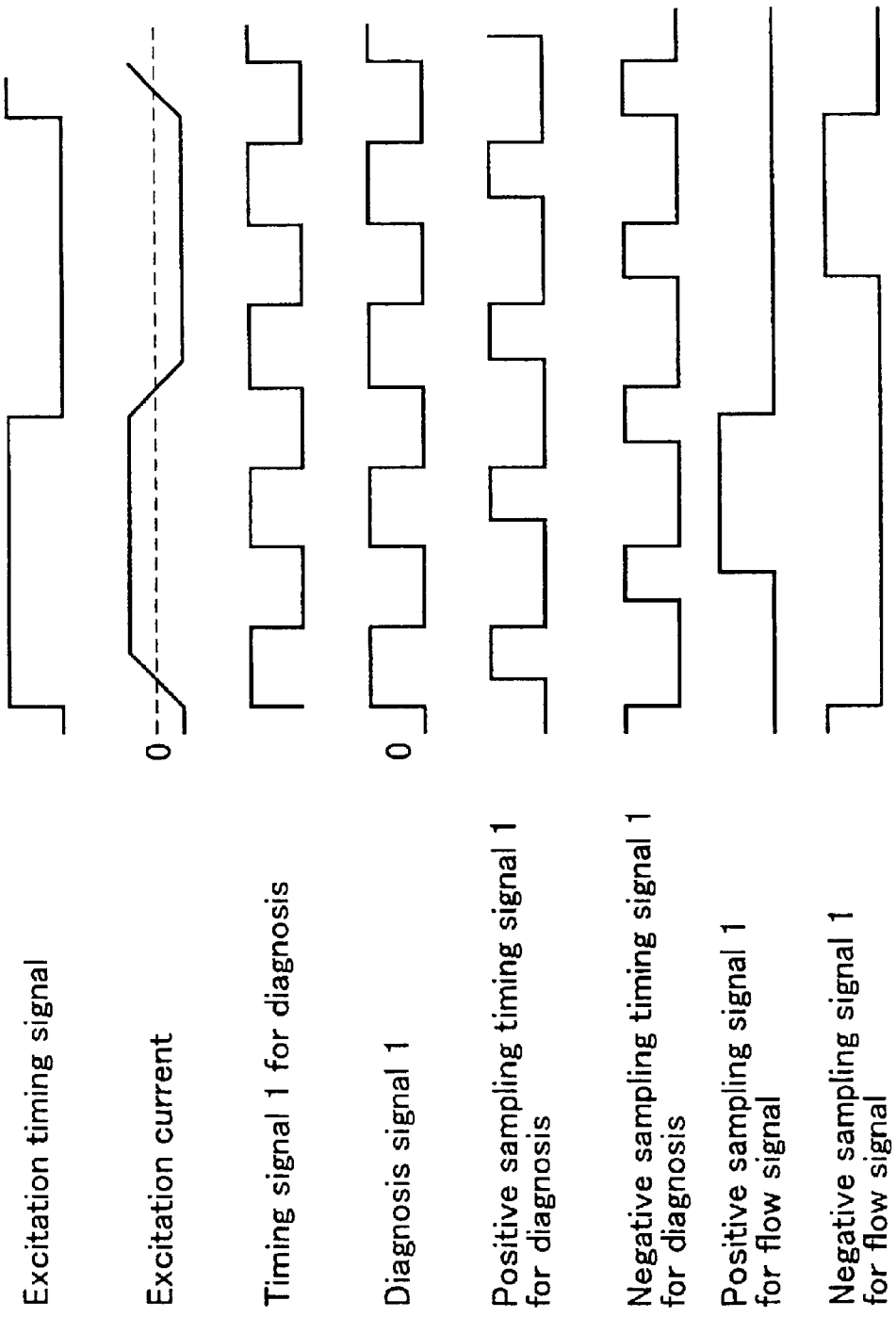

FIG.15

Method for diagnostic sampling signal in case of diagnostic signal frequency =4× excitation frequency

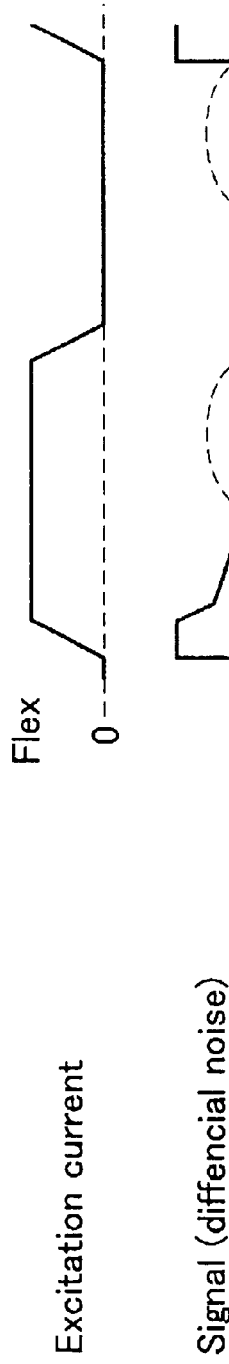

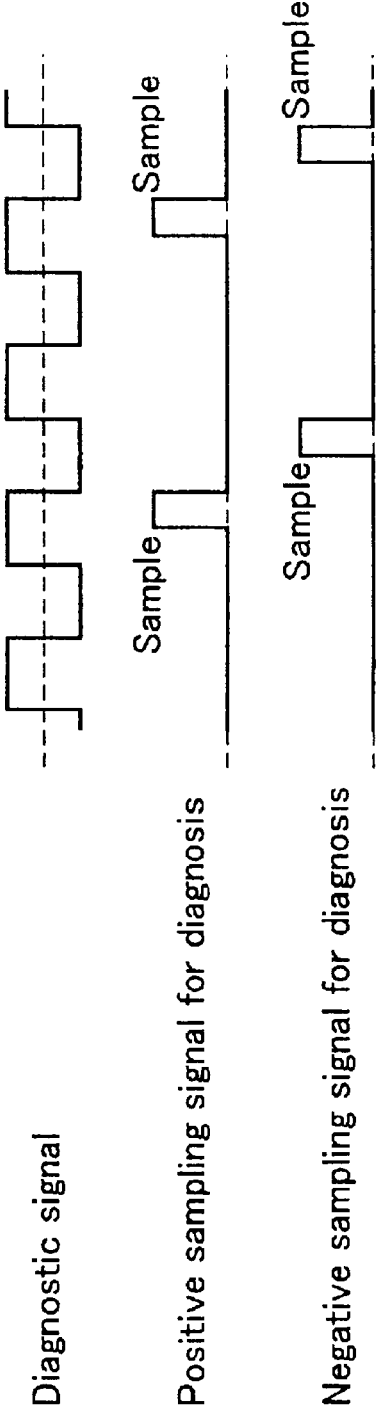

It is characteristic of the method that when the diagnostic signal frequency is set to a value four times or more of the excitation frequency, the diagnostic signal is sampled at the portions where the tails of the differential noise signal become small (latter half of each excitation interval).

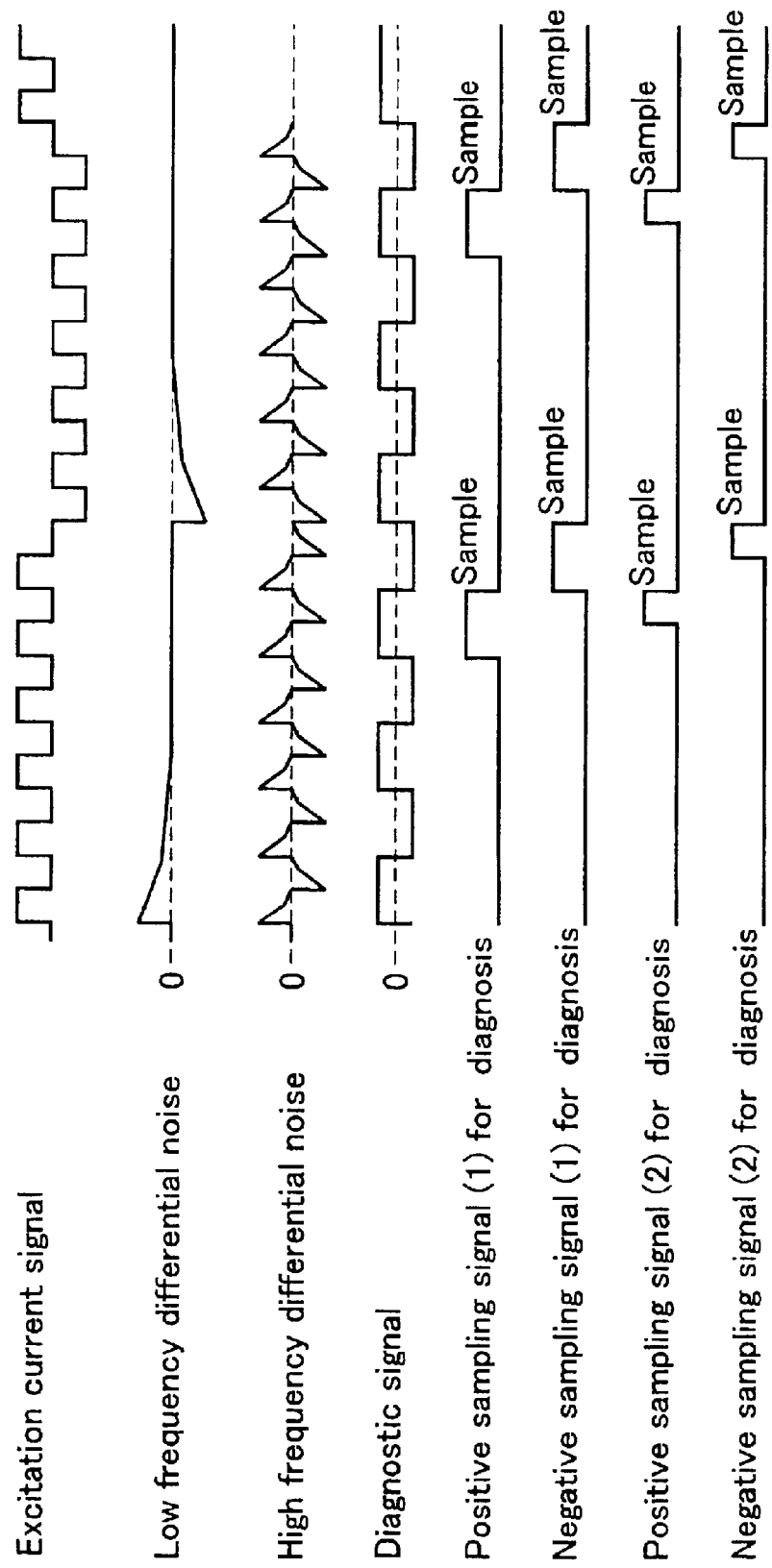

FIG.17
(a)
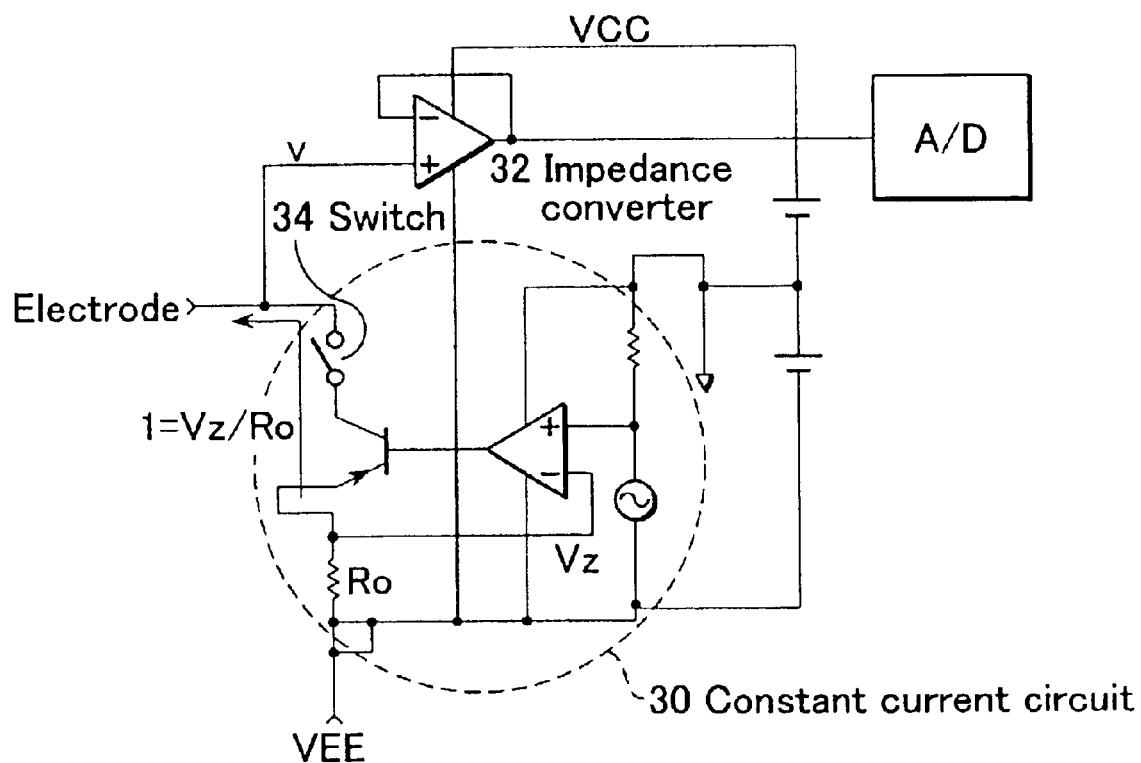
(b)
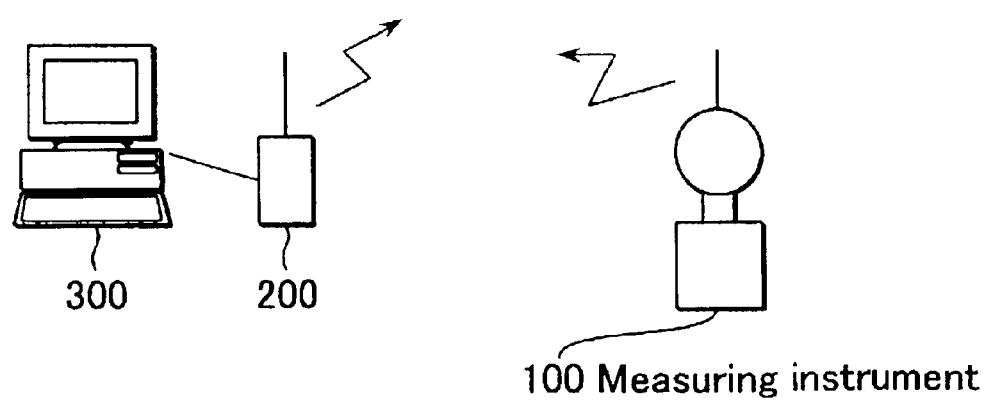

ELECTROMAGNETIC FLOWMETER

BACKGROUND OF THE INVENTION

1. Field of the Invention

The present invention relates to an electromagnetic flowmeter that measures the flow rate or the like of electroconductive fluids, and in particular to an electromagnetic flowmeter that carries out empty pipe detection, that is, whether the inside of the pipe is filled with fluid or not, as well as detects the presence of insulating materials adhering to the detecting electrodes and measures the electrical conductivity (hereafter simply called "conductivity") of the fluid to be measured.

2. Description of the Prior Art

As conventional electromagnetic flowmeters that carry out empty pipe detection, a configuration in which empty pipe detection is performed by a circuit which applies an alternating voltage having a frequency of 1/(an even number) of the excitation frequency, to the detecting electrodes inside the pipe, is disclosed in Japanese Patent No. 2880830. In addition, a configuration in which the above empty pipe detection is performed by a circuit that applies an alternating voltage having a frequency asynchronous with the excitation frequency is disclosed in Japanese National Publication of Patent Application No. 9-502267 (1997). Further, Japanese Patent Application Laid-Open No. 8-29223 (1996) discloses a configuration in which alternating signal generators that supply alternating currents are provided and the above empty pipe detection is performed by supplying to each detecting electrode in-phase alternating currents whose frequencies are sufficiently low.

In addition to the above, a conventional configuration to detect the extent of adhesion of insulating materials that adhere to detecting electrodes, is disclosed in Japanese Patent No. 3018310.This patent discloses a configuration such that, in an electromagnetic flowmeter which carries out empty pipe detection by comparing the detecting electrode potential of the detector with a reference voltage and comprises a constant current circuit that is provided with a current control means to change over and reverse the polarity of the current, the current is supplied to the detecting electrodes by changeover and inversion of the polarity upon detecting adhesion inside the pipe.

However, the configuration mentioned in Japanese Patent No. 2880830 is easily influenced by flow noise caused by the fact that fluid flows, due to the handling of signals whose frequency is smaller than the excitation frequency. In addition, since a large alternating voltage for empty pipe detection is generated in the flow signal even in the non-empty state due to the application of a low voltage, flow measurement is easily affected by the empty pipe detection circuit.

Further, in the configuration mentioned in Japanese National Publication of Patent Application No. 9-502267, since the result of flow sampling cannot avoid including the empty pipe detection signal, a number of averaging processes become necessary. For improving such influences, it is considered that the frequency of the empty pipe detection signal is made higher so that the flow signal and the empty pipe detection signal can be separated with a filter. However, in some cases, measured electrode impedances do not show accurate values due to structural dispersion in the electrode portions. Also, since a large alternating voltage for empty pipe detection is generated in the signal even in a not-empty state, flow measurement becomes to be easily affected by the empty pipe detection circuit.

Furthermore, in the configuration mentioned in an application of Japanese Patent Application Laid-Open No. 8-29223, since the empty pipe detection signal is always included in the result of flow sampling because the supplied alternating current signal is not synchronized with the excitation current, a number of averaging calculations become necessary. Also, the empty pipe detection signal is easily influenced by flow noise generated by the fact that fluid flows because a signal whose frequency is smaller than the excitation frequency is handled.

In the configuration mentioned in Japanese Patent No. 3018310, there is a problem that the means for empty pipe detection is easily influenced by the polarization voltage of the electrodes because direct current rather than alternating current is employed for detection.

In addition, the use of electromagnetic flowmeters in the field of agricultural waste water, as an application of electromagnetic flowmeters, has recently been considered. However, in some cases, earth and sand effluent is mixed in waste water but an electromagnetic flowmeter cannot be used for monitoring earth and sand effluent. In particular, irregular sedimentation of earth and sand in the lower reaches of rivers may occur and affect the environment in some cases, and thus if an electromagnetic flowmeter that can easily monitor earth and sand contained in waste water can be achieved, then environmental effects could be assessed by using such an electromagnetic flowmeter.

SUMMARY OF THE INVENTION

The present invention is devised in view of the above circumstances. The objective of the present invention is to provide an electromagnetic flowmeter that can accurately detect insulating materials stuck inside the pipe and discriminate between the type of fluid to be measured. Means for achieving this objective are as follows:

- employing alternating signal to detect adhesion of insulating materials and conductivity of the fluid inside the pipe,
- using a frequency that is an integer multiple of the fundamental excitation frequency as a signal frequency of a constant current supply, as well as synchronizing the excitation frequency with the frequency of adherents detection circuit signal,
- selecting a frequency that is not affected by the structural dispersion of the electrodes,
- accurately determining the electrode impedance by providing an electrode impedance measuring circuit and measuring the electrode impedance in the vicinity of the excitation frequency,
- realizing an electrode impedance measuring circuit that is not easily affected by fluid noise, and
- accurately measuring the electrode impedance for which the flow signal measuring circuit and the electrode impedance measuring circuit do not interfere with each other.

Embodiments for the present invention to achieve the above objective are described below.

(1) An electromagnetic flowmeter provided with a pipe through which the fluid to be measured is passed, which applies a magnetic field to the above-described fluid driving the excitation coils with an excitation circuit and thereby measures the flow rate of the fluid passing through the above-mentioned pipe, comprising:

- a pair of detecting electrodes to detect a flow signal corresponding to the flow rate of the fluid passing through the above-mentioned pipe, an earth electrode whose potential is the reference potential at the time of flow rate measurement, diagnosing signal generators that give diagnosing signals between the above detecting electrodes and the earth electrode, and a diagnosis circuit to detect resistance values between the above detecting electrodes and the earth electrode as diagnostic signals.

(2) An electromagnetic flowmeter mentioned in (1), wherein the above-described diagnosing signal generators are constant current supplies.

(3) An electromagnetic flowmeter mentioned in (1), wherein the above-described diagnosing signal generators are constant voltage supplies.

(4) An electromagnetic flowmeter mentioned in any of (1) to (3), wherein the above-described diagnosing signal generators use alternating signals whose frequency is an integer multiple of the excitation frequency used in the above excitation circuit.

(5) An electromagnetic flowmeter mentioned in (4), wherein the above-described diagnosis circuit synchronizes the above excitation frequency with the above diagnostic signal frequency.

(6) An electromagnetic flowmeter mentioned in either (4) or (5), wherein the above-described diagnosing signal generators select the frequency of the above-mentioned alternating signal to be generated in the range that the rotators of each dipole forming capacitances constructed with the above detecting electrodes and the above fluid interface can keep track of the signal.

(7) An electromagnetic flowmeter mentioned in any of (1) to (6), wherein the above-described diagnosing signal generators apply the above identical alternating signals to a pair of detecting electrodes as the above diagnosing signals.

(8) An electromagnetic flowmeter mentioned in any of (1) to (6), wherein the above-described electromagnetic flowmeter is small, in which, the distance between detecting electrodes is small, and the above diagnosing signal is applied alternately to each electrode.

(9) An electromagnetic flowmeter mentioned in any of (1) to (8), wherein the above-described diagnosis circuit makes the sampling time of flow signal be "1/(an integer multiple of the above alternating signal frequency)" when the above alternating signal frequency is an odd-number multiple of the above excitation frequency.

(10) An electromagnetic flowmeter mentioned in any of (1) to (9), wherein the above-described diagnosis circuit calculates the fluid conductivity using measured resistance values of the above detecting electrodes.

(11) An electromagnetic flowmeter mentioned in any of (1) to (9), wherein the above-described diagnosis circuit detects the status of insulating materials adhering to the above detecting electrodes using the above measured detecting electrode resistance values.

(12) An electromagnetic flowmeter mentioned in any of (1) to (11), wherein the above-described diagnosis circuit is provided with an analog output and a wireless communication output that transmit measured resistance and fluid conductivity values to an upper-level distributed control system or a personal computer.

(13) An electromagnetic flowmeter mentioned in any of (1) to (10), wherein each of the above-described constant current supplies possesses both an AC constant current circuit and a DC constant current circuit.

(14) An electromagnetic flowmeter mentioned in (13), wherein a signal based on the DC constant current supplies is used for empty pipe detection.

(15) An electromagnetic flowmeter mentioned in any of (1) to (9), wherein the above-described diagnosis circuit applies diagnosing signals between the above detecting electrodes and the above earth electrode when the above pipe is empty and detects deterioration of insulation at the above detecting electrodes using the diagnostic signal thereof.

(16) An electromagnetic flowmeter mentioned in (1), wherein the above-described diagnosing signal generators employ a frequency that is not an integer multiple of and higher than the above excitation frequency.

(17) An electromagnetic flowmeter mentioned in (16), wherein the above-described diagnosis circuit employs the time of "1/(an integer multiple of the above alternating signal frequency)" as the sampling time of flow signal.

(18) An electromagnetic flowmeter mentioned in (16) or (17), wherein the sampling timing for the flow signal and the above-described alternating signal frequency are derived from the same clock.

(19) An electromagnetic flowmeter mentioned in (16) or (17), wherein the sampling timing for the flow signal and the above-described alternating signal frequency are derived from separate clocks and the sampling time is calculated by counting the frequency of the above alternating signal and using the frequency thereof.

(20) An electromagnetic flowmeter mentioned in (16) or (19), wherein the above-described diagnosing signal generators generate frequencies in the range that the rotator of dipoles forming capacitances constructed by the above detecting electrodes and the interface of the fluid can keep track of the signal.

(21) An electromagnetic flowmeter mentioned in any of (16) to (20), wherein the above-described constant current supplies apply the above identical alternating signal to a pair of detecting electrodes as the above diagnosing signal.

(22) An electromagnetic flowmeter mentioned in (16) or (20), wherein the flowmeter is small, in which the distance between the above-described detecting electrodes is small, and is devised to pass a current to each electrode alternately.

(23) An electromagnetic flowmeter mentioned in any of (1) to (22), wherein the above-described diagnosis circuit sets the frequency of the above diagnosing signal to four times or more the above excitation frequency and the above diagnostic signal is sampled at the latter half of the excitation waveforms.

(24) An electromagnetic flowmeter mentioned in any of (1) to (23), wherein the above-described diagnosis circuit is provided with a adhesion diagnosis circuit that can alternately determine the fluid resistance values using at least two frequencies of the above alternating signal, discriminate the linear portion of the Cole-Cole plot based on the above resistance values, and select the frequency of the above diagnostic signal so that the above fluid resistance values by the diagnosing signal agree with the above resistance value at the above excitation frequency.

(25) An electromagnetic flowmeter mentioned in any of (1) to (15) or (24), using the dual-frequency excitation system that applies a magnetic field to the above-described fluid by driving the above excitation coils employing two excitation frequencies through the above excitation circuit, and provided with:

a means that synchronizes the excitation signal and the above flow signal with the above diagnosing signal, a means that makes the frequency of the above diagnosing signal be an intermediate frequency between the high and low frequencies of the above two excitation frequencies, and a means that sets the above diagnosing signal frequency as an even-number multiple of the above low frequency and also sets the above diagnosing signal frequency as 1/(an even number) of the above high frequency; further comprising an adhesion diagnosis circuit in which the low frequency differential noise components are removed at the latter half of the above low frequency period for the sampling of the above diagnostic signal and the sampling interval is composed of the time for one period of the above high frequency, in which the influence of high frequency noise components is removed, and the latter half of the excitation waveform.

BRIEF DESCRIPTION OF THE DRAWINGS

FIG. 3 shows the circuit diagram of the constant current supply.

FIG. 14 is a timing chart indicating the frequency of a diagnosis circuit for the fundamental excitation frequency.

FIG. 15 is a timing chart in the case of single frequency excitation.

FIG. 16 is a timing chart in the case of dual frequency excitation.

FIG. 17 shows an illustration for an electromagnetic flowmeter to which a function to monitor the amount of earth and sand is added.

FIG. 17 (a) shows a circuit diagram indicating a constant current circuit for measuring conductivity.

FIG. 17 (b) shows a simplified schematic diagram for transferring data to an upper-level computer system.

DETAILED DESCRIPTION OF THE PREFERRED EMBODIMENTS

Embodiment 1

Figure 1:
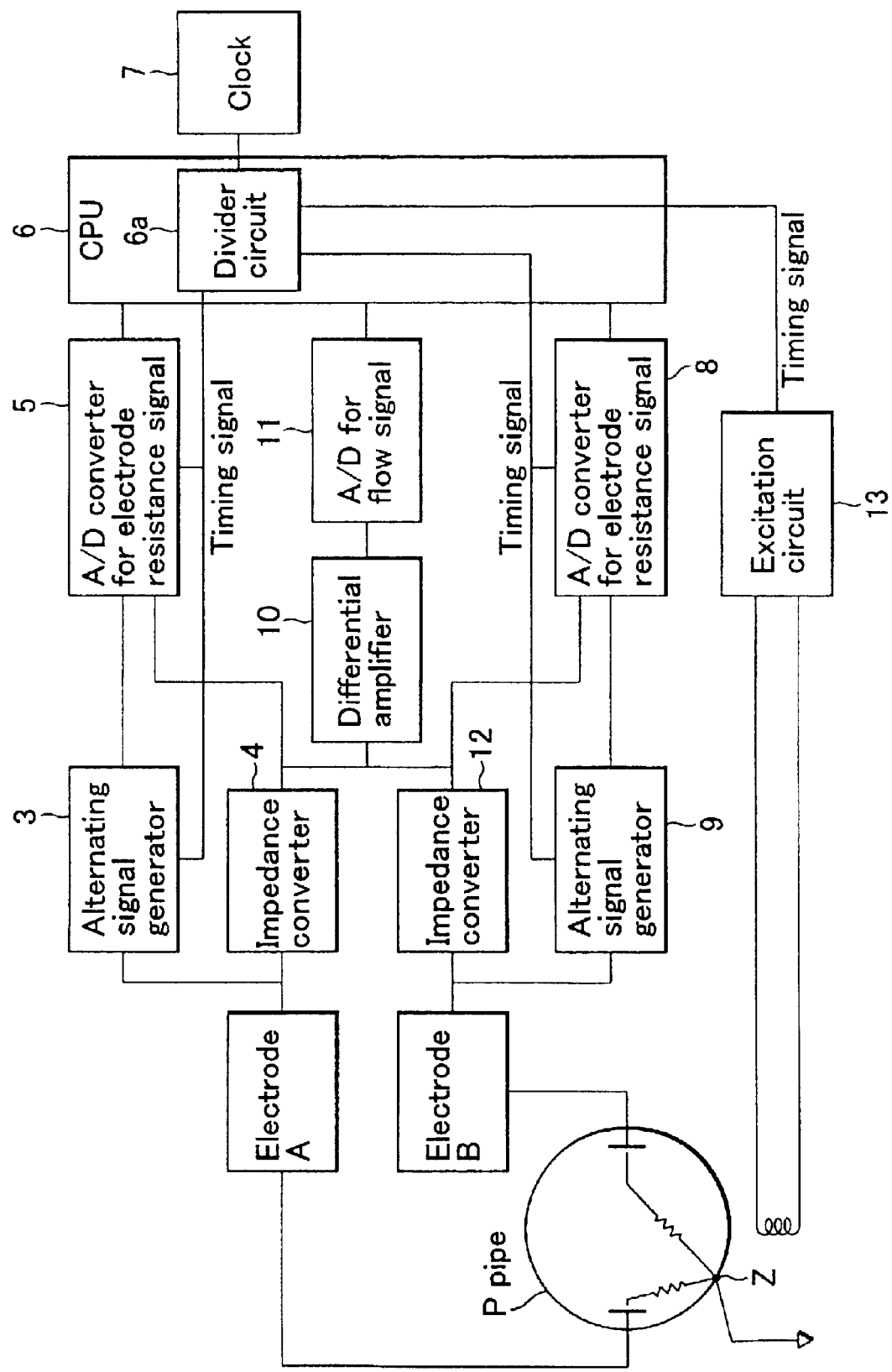
FIG. 1 is a block diagram for embodiment 1 of the present invention.

FIG. 1 is a block diagram for the first embodiment of the present invention.

As shown in FIG. 1, alternating signal generators 3 and 9 for generating alternating signals (diagnosing signals) are connected to electrodes (detecting electrodes, hereafter simply called "electrodes") A and B as diagnosing signal generators to generate diagnosing signals, and impedance converters 4 and 12 are also connected to electrodes A and B. To alternating signal generators 3 and 9, A/D converters for electrode resistance signals 5 and 8 are connected for synchronous detection and A/D conversion of diagnosing signals generated at electrodes A and B. Divider circuit 6a for dividing clock signal 7 is provided in CPU 6. The timing signal from this divider circuit 6a is output to alternating signal generators 3 and 9 and excitation circuit 13.

In addition, timing signals from divider circuit 6a also become the diagnostic timing signals and are output to A/D converters for electrode resistance signals 5 and 8. Further, impedance converters 4 and 12 are connected to differential amplifier 10 which is connected to the A/D converter for flow signal 11 whose output is connected to CPU 6.

In the present invention, alternating signals are applied as diagnosing signals respectively from alternating signal generators 3 and 9 between electrodes A or B and earth electrode Z (in electromagnetic flowmeters, an earth electrode such as an earth ring or the like that provides the reference potential of flow measurement, installed in pipe P). The empty pipe detection, detection of adhesion of insulating materials to electrodes A and B, and measurement of fluid conductivity are performed by obtaining diagnosing signals generated at electrodes A and B depending on resistances between electrode A or B and earth electrode Z, carrying out synchronous detection, performing A/D conversion with A/D converters for electrode resistance signals 5 and 8, and using those resistance values.

Figure 2:
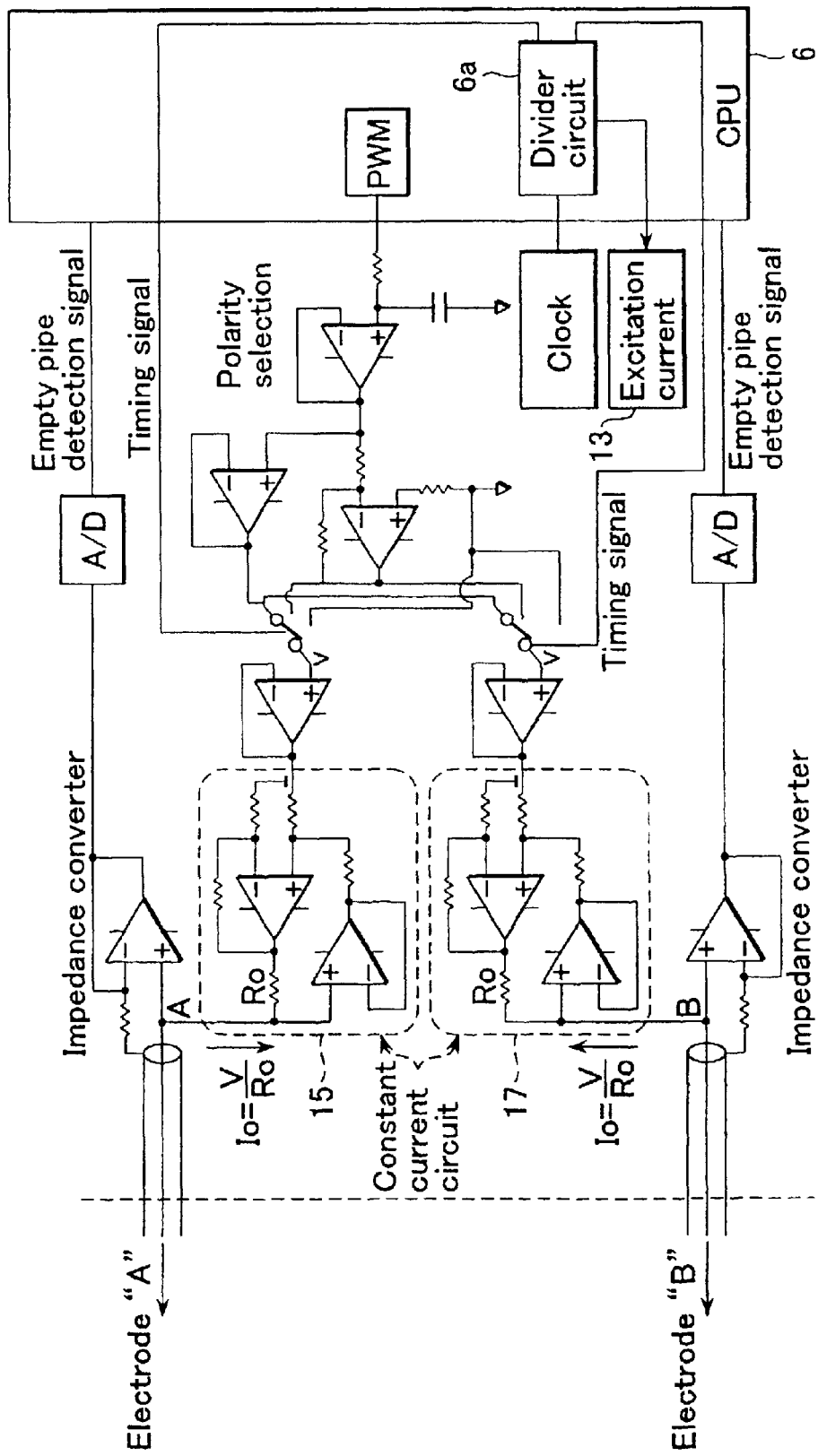
FIG. 2 shows a circuit diagram in the case where constant current supplies are adopted as the alternating current generators in embodiment 1 of the present invention.

In these operations, as shown in FIG. 2, for example, if constant current supplies (constant current circuits 15 and 17) are used as alternating signal generators 3 and 9, the alternating resistance R for electrodes A or B can be calculated as R=Vo/Io respectively assuming the constant alternating current value to be Io and the diagnosing signal voltage that appears at electrode A or B to be Vo. As a result, the electrode resistance R reflects the state of insulating material adhering to, pipe empty status at, and fluid conductivity for, electrode A or B.

FIGS. 3(a) and (b) also indicate examples of circuits using the constant current supply. In FIG. 3(a), signal wire 20 from electrode A or B on the detector side is connected to impedance converter 21 and constant current circuit 19, a constant current supply, is provided between them. Constant current circuit 19 is connected to CPU 6 via switch SW1 which is switched with a frequency of an integer multiple of the excitation frequency. As a result, the generated alternating current is an integer multiple of the excitation frequency.

Also in FIG. 3(b), similar to FIG. 3(a), constant current supply 22 is provided between signal wire 20 and impedance converter 21 and CPU 6 is connected to constant current supply 22 via switch SW1. This switch SW1 is switched with a frequency of an integer multiple of the excitation frequency like in FIG. 3(a), and thus the generated alternating current has a frequency of an integer multiple of the excitation frequency.

FIG. 2 and FIG. 3 are examples of using constant current supplies (constant current circuit 15, 17, 19, or 22). As shown in Table 1 on the next page, since these supplies can vary the generated current values, the insulating material adhesion status and pipe empty status for electrodes A and B and fluid conductivity can be diagnosed by changing over the constant current values depending on the detected resistances between electrode A or B and earth electrode Z.

TABLE 1

| Purpose | Resistance between the electrode and earth electrode | Constant current value | Action |
| --- | --- | --- | --- |
| Conductivity measurement | Small | Large | Conversion is done by preparing a table showing the relationship between measured resistance and conductivity. |
| Detection of adhesion and empty pipe | Large | Small | Abnormal or deteriorated Status is notified at the spot where the span error exceeds the prescribed value from the input impedance of the input amplifier. |

Next, the method for separately carrying out fluid conductivity measurement and adhesion detection will be described.

First, the fluid conductivity measurement is carried out as described below.

The fluid resistance (R) is inversely proportional to electrode area (S) and fluid conductivity ($\sigma$). Expressed as an equation, $R=k/S/\sigma$ (where k is a proportional coefficient). Accordingly, the fluid resistance at the lowest conductivity shown in the specifications is determined in advance with the surfaces of electrodes A and B cleaned. If measured fluid resistance R is smaller than that value, the situation is handled as the conductivity measuring region.

For fluid conductivity $\sigma$, it is calculated using the preliminarily known electrode area S, the proportional coefficient k, and the value of measured fluid resistance R.

Next, detection of insulating material adhering to the electrodes is carried out as described below.

The insulating material is considered to be adhering to the electrodes when the above-mentioned fluid resistance exceeds the fluid resistance in the conductivity measuring region. In this case, the index that shows abnormal status or deteriorated status for the electrodes is based on the input impedance of the impedance converter shown in FIG. 1.

Figure 11:
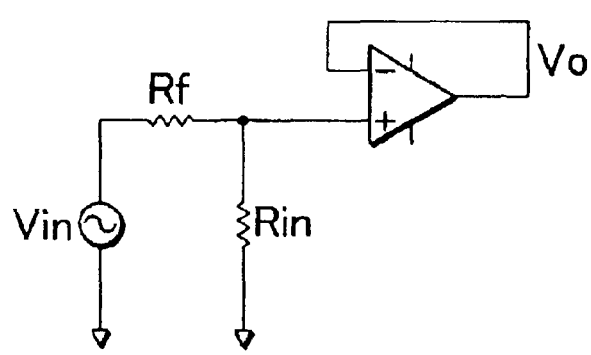
FIG. 11 shows a circuit diagram including the signal source resistance and the input resistance for examining the influence of the signal source resistance due to substances adhering to the electrodes.

The results of calculating the extent of error in the resistance values between electrode A or B and earth electrode Z generated due to insulating material adhering to the electrodes based on the configuration shown in FIG. 11 are presented in Table 2 below. In this case, the input impedance of the impedance converter is assumed to be 2000 MΩ. This error is a span error and thus can be calculated simply using the voltage dividing ratio. For example, if it is assumed that the resistance between electrode A or B and earth electrode Z is 20 MΩ, a span error of 1% may occur. Since the timing for issuing alarms depends on the user's accuracy requirements, both the measured fluid resistance and indication error may be output as analog values.

TABLE 2

Influence of Signal Source Resistance

| Input resistance (MΩ) | Signal source resistance (MΩ) | Error (%) |
| --- | --- | --- |
| 2000 | 3.3 | 0.16 |
| 2000 | 5 | 0.25 |
| 2000 | 10 | 0.50 |
| 2000 | 20 | 0.99 |
| 2000 | 40 | 1.96 |

In addition, if a single range constant current supply is configured for abnormality detection such as adhesion detection or empty pipe detection, it is advantageous that the alternating diagnosing signal used for measuring the electrode resistance when the pipe is-filled with water and there are no adherents on electrodes can be very small compared with the method of applying a constant voltage to the electrodes. This is because the resistance between electrode A or B and earth electrode Z when the pipe is filled with water and there is no adherent is sufficiently smaller than that in the above-described abnormal condition. Further, if fluid conductivity is known in advance, the adhesion status can also be detected using the difference between the measured fluid resistance and the resistance calculated from the fluid conductivity after temperature compensation.

Furthermore, although an example of using a constant current supply to output a rectangular wave is shown in this embodiment of the present invention, constant current supplies outputting sinusoidal or triangular waves may also be used. However, since synchronization is based on the frequency of the diagnosing signal being an even-number multiple of the excitation frequency, signal processing of rectangular waves may be easier.

In addition, although an example using a constant current supply as the diagnosing signal generator is shown in this embodiment of the present invention, if a configuration using a constant voltage supply instead of constant current supply is employed, the present invention can be applied as it is.

Constant current supplies 19 and 22 shown in FIG. 3(a) and (b) can be used both as an AC constant current circuit and DC constant current circuit. For separate AC and DC current supplies, a bootstrap circuit is used to raise the input impedance of impedance converter 21 or drive shielding is used for the cable shield (signal wire 20). In this case, if the resistance between electrode A or B and earth electrode Z to which positive feedback is applied becomes extremely high (several hundred mΩ or more), impedance converter 21 may generate oscillation. For this reason, if the resistance between electrode A or B and earth electrode Z increases to an extremely high value as in the case of an empty pipe, the voltage detected at the electrode is made to be the supply voltage by passing the DC constant current before constant current supplies 19 and 22 start to oscillate. Then, the DC voltage of impedance converter 21 is monitored, empty pipe status is discriminated, and the operation of constant current value is stopped (constant current value is made zero). This avoids the problem of oscillation.

Also in the configuration shown in FIG. 2, this measure becomes possible by adding a DC voltage to the part to which the reference voltage (V) is applied in constant current circuit 15 or 17.

Next, the frequency to be used for measurement will be described.

The frequency for diagnostic timing in the diagnosis circuit is set as an integer multiple of the excitation frequency as interpreted from FIG. 3(a) and (b). Frequency components included in the excitation current and flow signal are composed of the fundamental excitation frequency and harmonic components of its odd number multiples. For this reason, a diagnosis circuit can be achieved, which does not affect the excitation current and flow signal in principle, by making the frequency for diagnostic timing in the diagnosis circuit be an even-number multiple of the excitation frequency.

In addition, even if the frequency for diagnostic timing for the diagnosis circuit is selected to be an odd-number multiple of the excitation frequency, a flow signal measuring circuit that is not affected by the diagnosis circuit can be obtained by taking the sampling interval for flow signal as the time when the integrated value of diagnosing signal becomes zero.

In this case, in embodiment 1, it-is decided to adopt a system to synchronize the excitation timing and diagnostic timing. If these two kinds of timing are made asynchronous, two oscillators become necessary and an even-number multiple of the excitation frequency may not be obtained due to the difference in temperature characteristics of two oscillators, and thus due to this frequency shift, the detection voltage used in the diagnosis circuit may affect the flow signal. For this reason, in embodiment 1, the synchronizing system is adopted. According to this system, since timing signals divided from the same clock are used, if it is assumed that the original oscillation frequency of the clock varies with ambient temperatures, synchronization of excitation frequency with diagnosis frequency is not lost, and this enables a diagnosis circuit and a flow signal measuring circuit that are hardly affected by temperature changes to be obtained.

For the higher limit of this frequency, there is a problem of structural dispersion for electrode capacitance in electrodes A and B. This means that the rotation of the dipole forming a capacitance no longer keeps track of the frequency if the frequency for the capacitance formed with a metal composing an electrode and the interface of the fluid is raised high. Since the AC resistance for this region is greatly different from that at lower frequencies, the frequency must be limited in the region where the electrode capacitance does not cause structural dispersion to occur.

Figure 9:
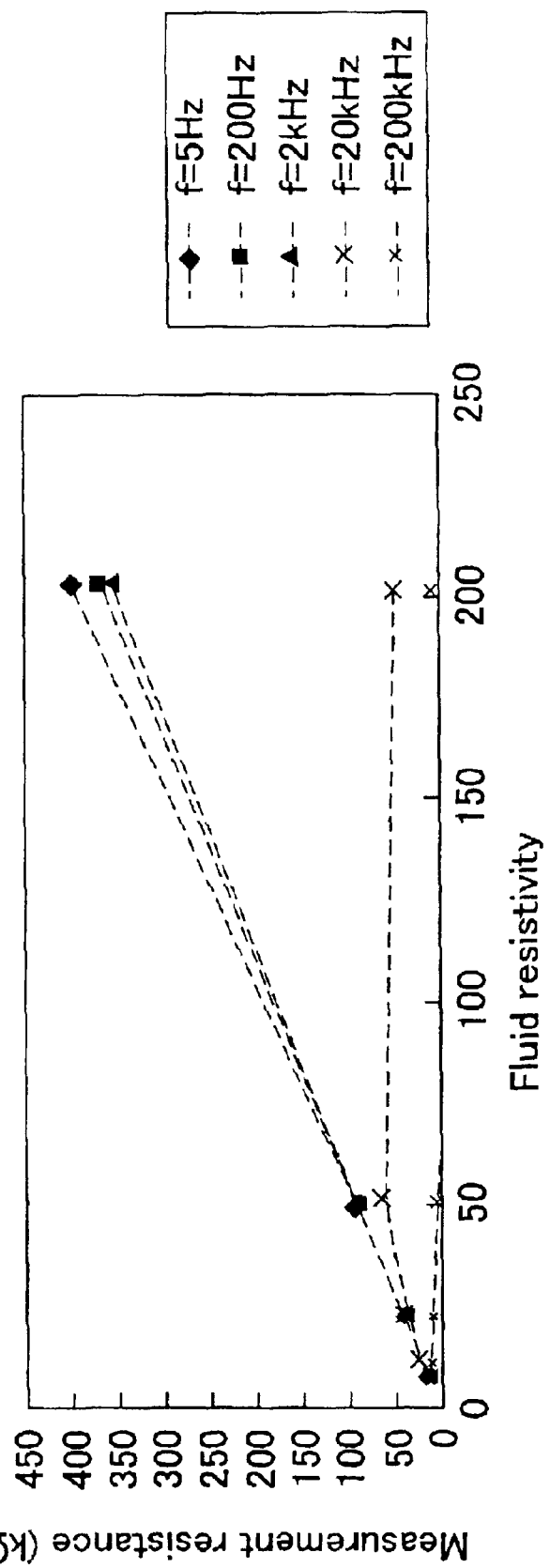
FIG. 9 shows a graph indicating the relationship between the fluid resistivity and the fluid resistance if stainless steel (SUS) electrodes are used when water demineralized by ion-exchange is employed as the fluid.

To explain this fact, the relationship between fluid resistivity and AC resistance is shown in FIG. 9. FIG. 9 is a graph showing the relationship between fluid resistivity and fluid resistance in the case where water demineralized by ion-exchange is used as the fluid and stainless steel electrodes are used. In FIG. 9, if the diagnosis frequency exceeds 20 kHz, the AC resistance is not linear to fluid resistance. On the other hand, if the diagnosis frequency is 2 kHz or less, the AC resistance at 2 kHz agrees with that at lower frequencies. By adopting a frequency in this region, the same AC resistance as that at the excitation frequency used for flow signal detection can be measured. However, as shown in the prior art, this system makes separation of the flow signal from the diagnosing signal with a filter difficult, and so it is essential to employ the aforementioned synchronizing system.

Figure 10:
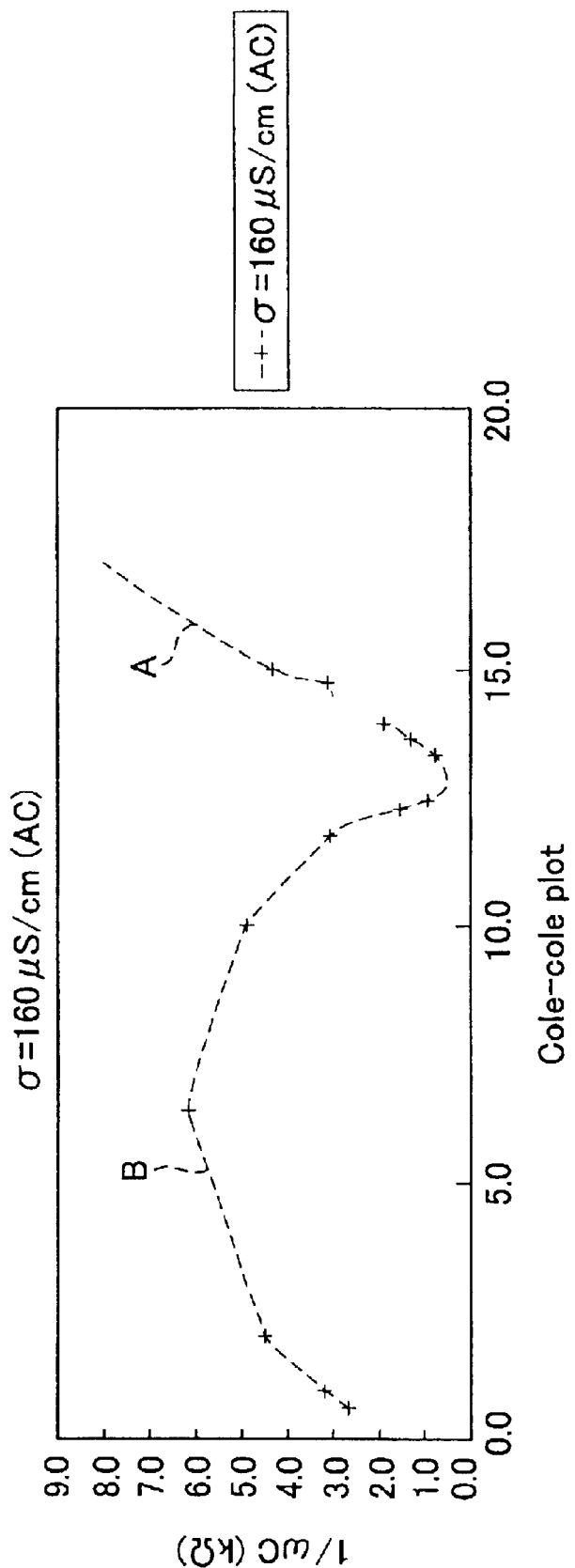
FIG. 10 shows a graph indicating a Cole-Cole plot obtained by measuring an electrode impedance to determine the upper limit of the frequency and plotting the real part and imaginary part thereof.

To determine the upper limit of the frequency, measurement of electrode impedances and preparing a plot of their real and imaginary parts (Cole-Cole plot) will suffice. This example of measurement, that is, the result of plots, is shown in FIG. 10, in which the graph consists of linear portion A and circular arc portion B. The circular arc portion B indicates a high frequency region and the linear portion A indicates a low frequency region. The AC resistance at the linear portion indicates a characteristic in which the fluid resistivity and fluid resistance have a linear relationship as shown in FIG. 9. The circular arc portion B in FIG. 10 shows a region where the above-described structural dispersion occurs.

For this reason, a frequency higher than that used for the diagnosis circuit shown in embodiments described later may also be selected while determining the upper limit of the frequency from the practically employed electrode material, fluid conductivity and the type of fluid in advance. This frequency selection method enables the AC resistance at the frequency matching the actual excitation frequency to be measured.

Next, signal timings for each signal actually used in the present invention will be described using the drawings of FIG. 4 to FIG. 8.

In the following, the excitation timing signal represents the timing when applying excitation current to the excitation coil in the pipe and the excitation current waveform represents the excitation status and also is a signal waveform that corresponds to the flow detection signal. Diagnostic timing signals 1 to 5 represent the timings of applying AC currents between electrode A or B and earth electrode Z from AC constant current generators 5 and 8 or others corresponding to the timing generated by CPU 6 or divider circuit 6a or the like. The diagnostic signal represents a signal waveform corresponding to the resistance detection signal obtained between electrode A or B and earth electrode Z. Positive (or negative) sampling timing signals 1 to 5 for diagnosis are timings for signal processing after acquiring diagnostic signals.

Voltages generated at electrodes A and B depending on the resistances between electrode A or B and earth electrode Z are detected by sampling (synchronous detection) the positive part and negative part of each diagnostic signal detected from electrodes A and B and taking their difference. Although the sampling interval employs ¼-wave sampling, half-wave sampling can also be employed. In the case of half-wave sampling, conversion of the signal to DC in the absolute value circuit and then implementation of A/D conversion of the DC voltage can also be employed.

Meanwhile, FIG. 4 to FIG. 7 show embodiments in which the diagnosis frequency for the diagnosis circuit is an even-number multiple of the fundamental excitation frequency.

Figure 4:
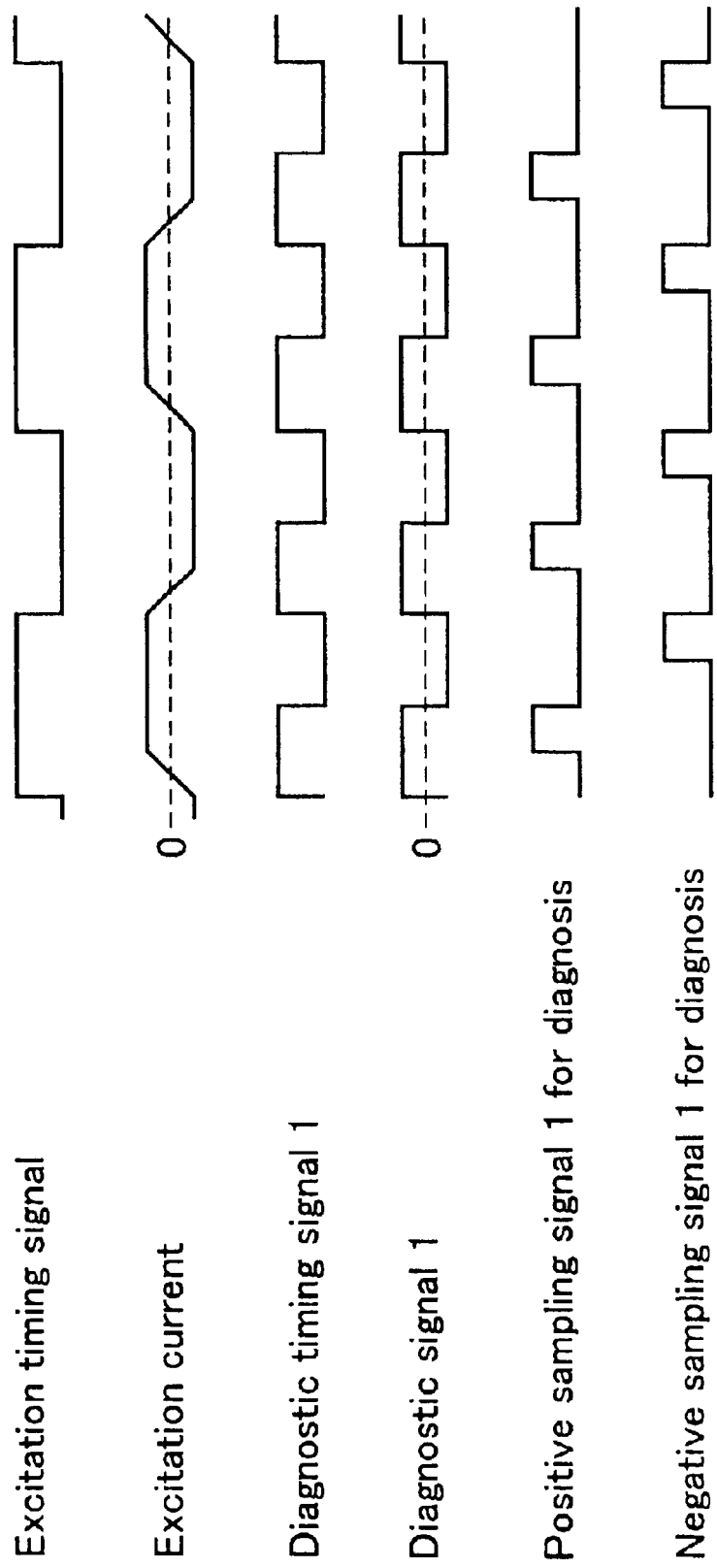
FIG. 4 is a timing chart for which the frequency of the diagnosis circuit is made twice the fundamental excitation frequency.
Figure 6:
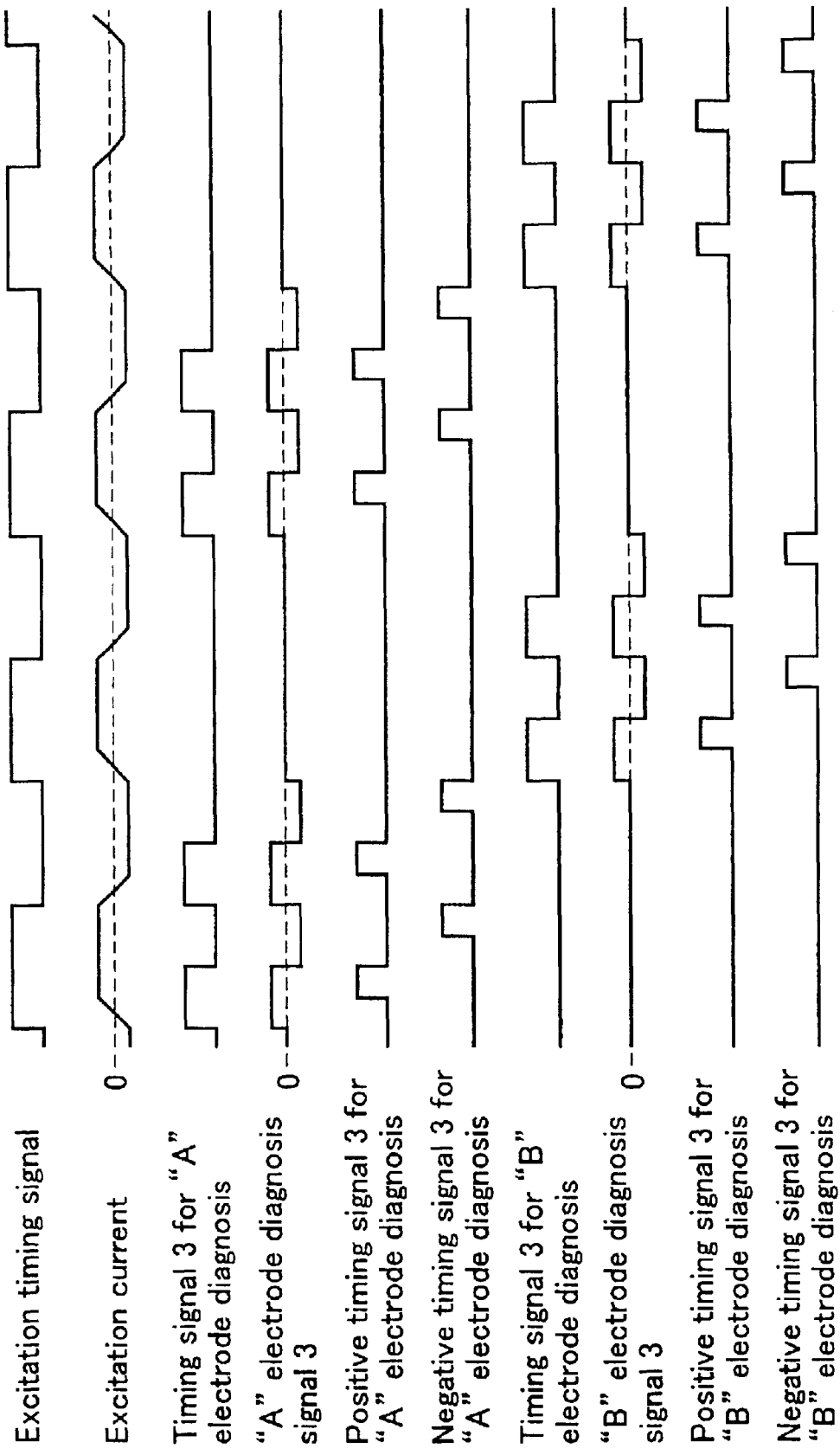
FIG. 6 is another timing chart for which the frequency of the diagnosis circuit is made twice the fundamental excitation frequency.

FIG. 4 and FIG. 6 show embodiments in which the diagnosis frequency for the diagnosis circuit is twice the excitation frequency.

Although the flow signals to be primarily detected include diagnosing signals in each sampling at positive and negative excitations when sampling the flow signal and are affected by the diagnosing signals, those effects can be canceled by taking the difference between each flow signal at positive and negative excitations.

Figure 5:
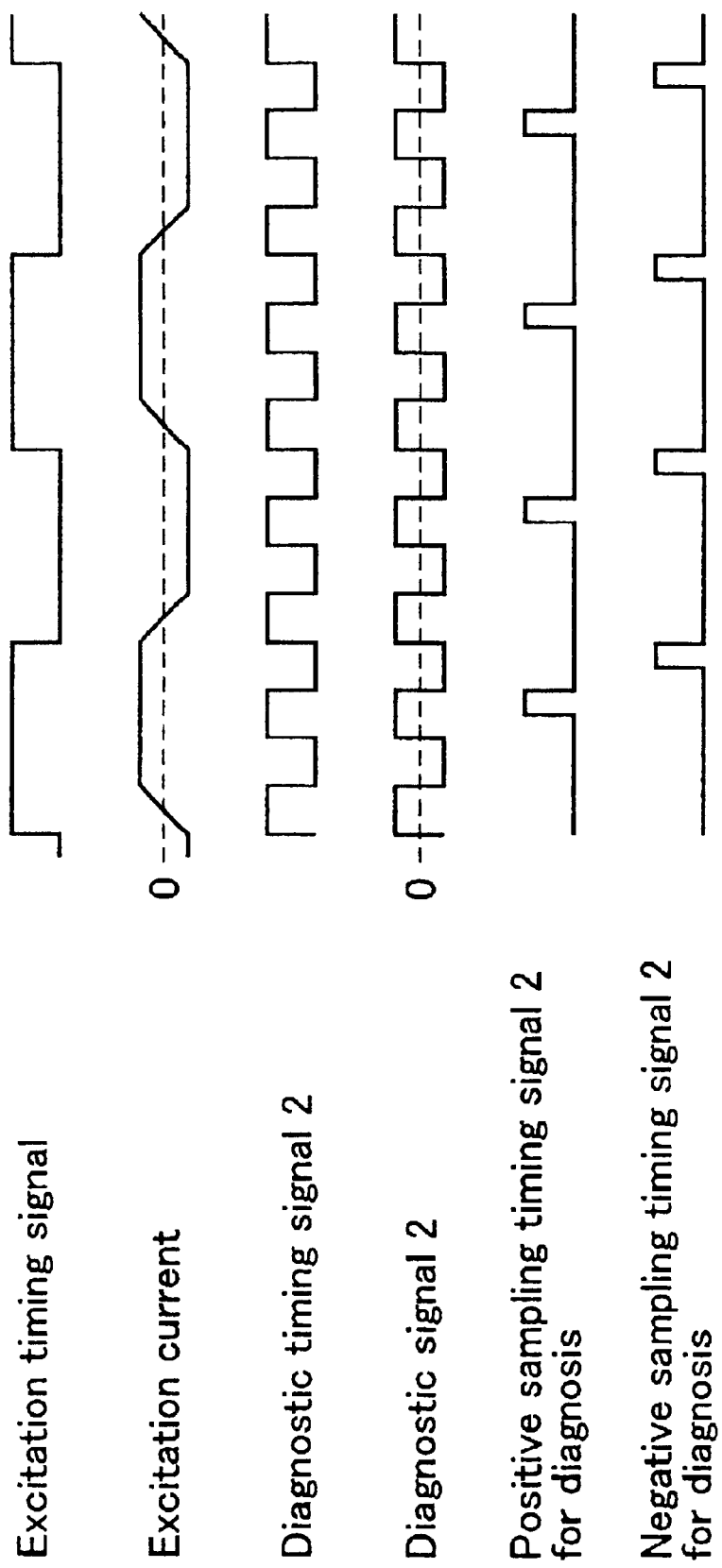
FIG. 5 is a timing chart for which the frequency of the diagnosis circuit is made an even-number multiple of the fundamental excitation frequency.
Figure 7:
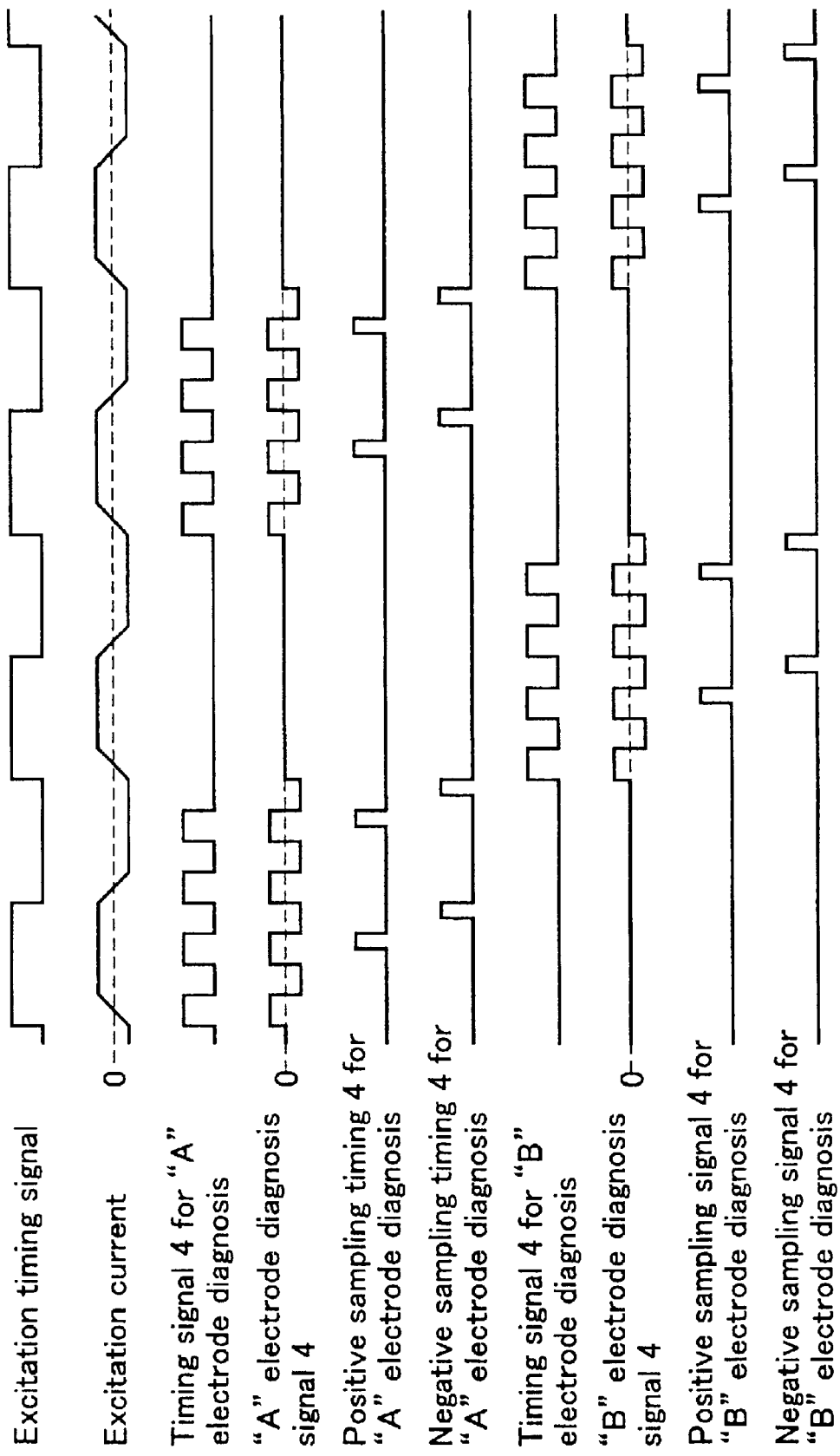
FIG. 7 is another timing chart for which the frequency of the diagnosis circuit is made an even-number multiple of the fundamental excitation frequency.

FIG. 5 and FIG. 7 show embodiments in which the diagnosis frequency for the diagnosis circuit is four times the excitation frequency.

In these embodiments, sampling at the portions where influences of differential noise contained in diagnosing signals become small is enabled and thus the accuracy of measuring fluid resistance is improved.

Electromagnetic flowmeters for FIG. 4 and FIG. 5 employ a system where constant current is passed through each of electrodes A and B simultaneously. This system is preferably applied to flowmeters whose distance between electrodes A and B is large. In this case, if the insulating material adhesion status is nearly the same at both electrodes A and B, the diagnosing signals generated at electrodes A and B show nearly identical values and so the diagnosing signal in the output of the differential amplifier (differential amplifier 10) for flow signal measurement shown in FIG. 1 becomes nearly zero.

Electromagnetic flowmeters for FIG. 6 and FIG. 7 are those whose diametric sizes are small, that is, the distance between electrodes is small. In small-size flowmeters, since the distance between electrodes A and B is small and both electrodes are affected by each other, the timings for applying constant current are changed so that the current is not passed to both electrodes simultaneously.

Figure 8:
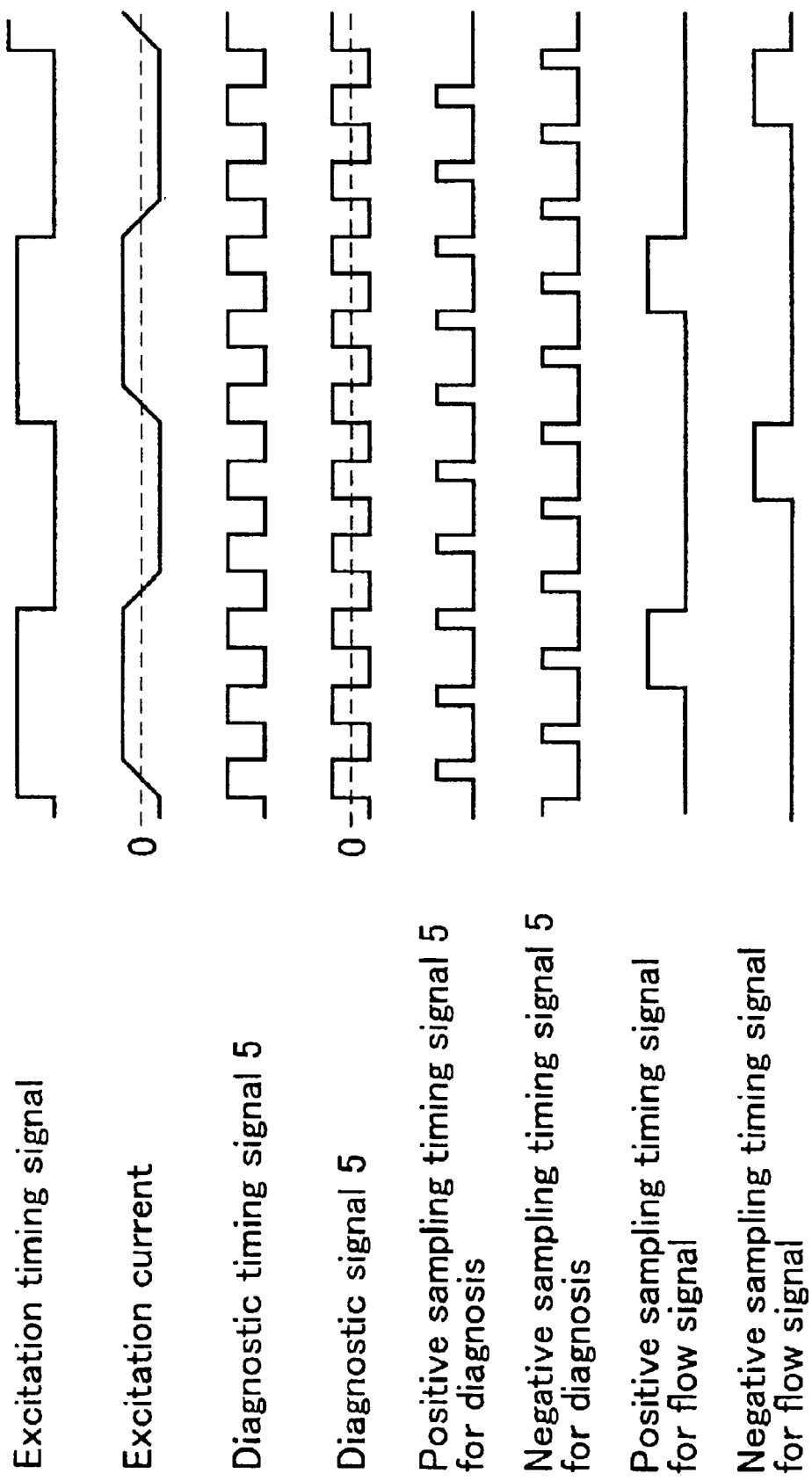
FIG. 8 is a timing chart for which the frequency of the diagnosis circuit is made an odd-number multiple of the fundamental excitation frequency.

FIG. 8 shows an embodiment in which the frequency related to diagnostic timing for the diagnosis circuit is selected to be an odd-number multiple of the fundamental excitation frequency.

In this case, the sampling interval for the flow signal is set to a time such that the integrated value of the diagnosing signal becomes zero. By this sampling interval selection, a flow signal measuring circuit that is not affected by the diagnosis circuit can be obtained.

As a method for diagnosing whether adhesion is caused by insulating material adhering to electrodes A and/or B or by adhering to the earth electrode after adhesion diagnosis, a circuit may be added for applying constant current between a pair of measuring electrodes A and B and, after adhesion diagnosis, the resistance between electrodes A and B may be measured by operating this circuit. If the resistance between electrodes A and B is small, adhering to the earth electrode can be diagnosed. In this case, the above is extremely advantageous in electromagnetic flowmeters that have an electrode cleaning function and those whose batteries can be replaced.

Then, excitation is stopped after detecting adhesion when the fluid resistance enters the usable range (fluid conductivity measurable range). This enables operations at low power consumption.

Figure 18:
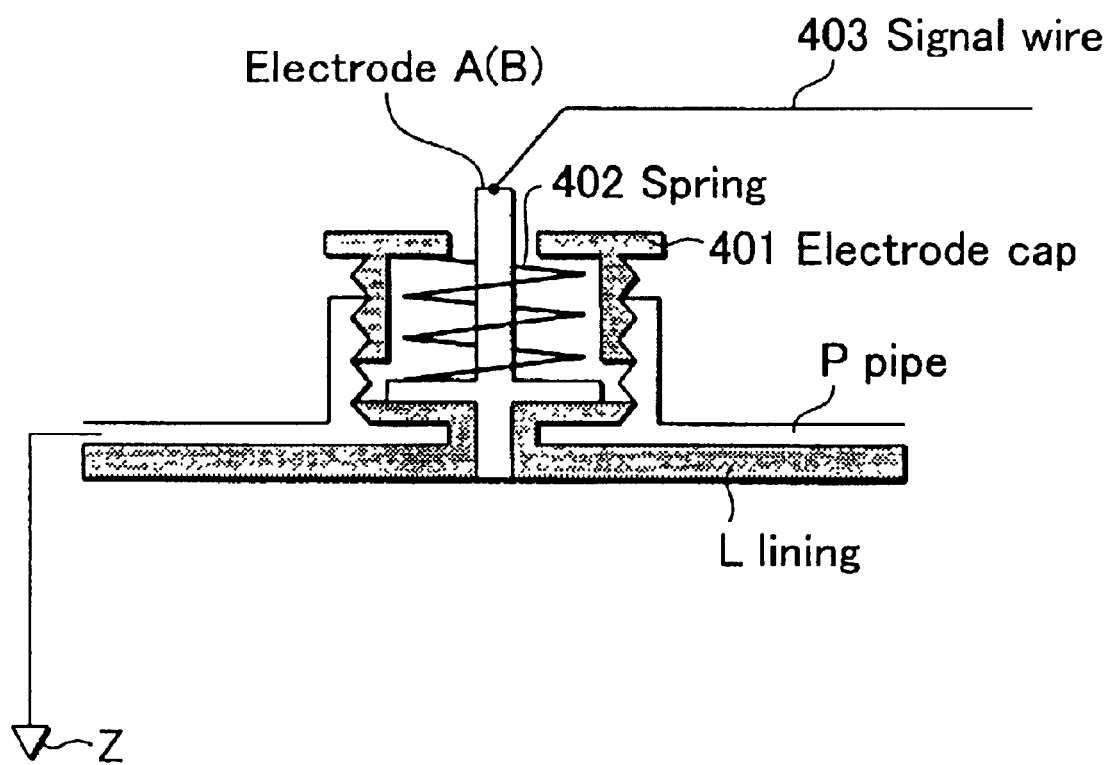
FIG. 18 shows a drawing representing the condition of electrode installation in the pipe.

FIG. 18 represents the status of electrode A (B) installed in pipe P. On the inside surface of pipe P wetted with the fluid, lining L made of Teflon (registered trademark) or urethane, for example, is formed and electrode A (B) provided with signal wire 403 is installed so that it is wetted with the fluid to be measured. For ease of maintenance, electrode A (B) is configured to be press-fitted to pipe P using electrode cap 401 and spring 402. Pipe P is at the same potential as earth electrode Z.

In some cases, the fluid to be measured may enter the gap between electrode cap 401 and electrode A (B) and it the fluid to be measured stagnates in the gap, erroneous operation may occur. The present invention can be used to detect such erroneous operation. In other words, the diagnostic system shown in FIG. 1 is applied when pipe P is empty. If the fluid to be measured is not stagnating, the resistance between electrode A (B) and earth electrode Z is infinity and if the fluid to be measured is stagnating, the resistance between electrode A (B) and earth electrode Z is smaller. If this resistance value is of the order of tens to hundreds of M$\Omega$, it does not affect flow measurement, but if it is less than those values, it causes a span error and adversely affects the measurement.

The above-mentioned present invention, since it can measure resistances of several to tens of M$\Omega$, can detect whether such fluid to be measured is stagnating or not around the electrodes.

Furthermore, the above measured conductivity of the fluid to be measured, insulating material adhesion status on electrodes A and B, empty pipe detection information, information on water intrusion toward the electrodes, etc. may be transmitted to a large control system or a small computer system such as a personal computer to be connected to an upper-level system using a wireless communication means installed in an electromnagnetic flowmeter of the present invention.

Embodiment 2

Figure 12:
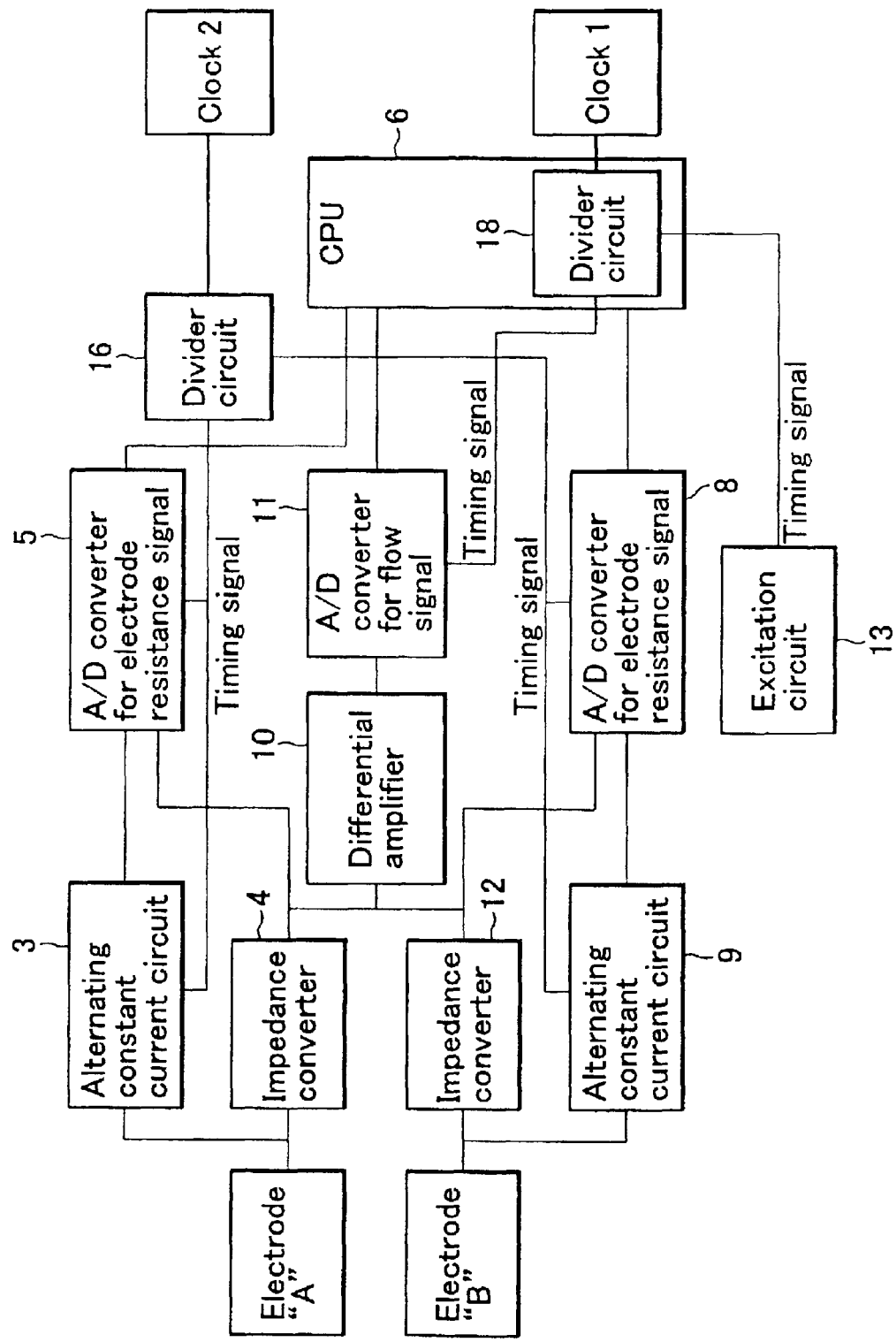
FIG. 12 is a block diagram for embodiment 2 of the present invention.
Figure 13:
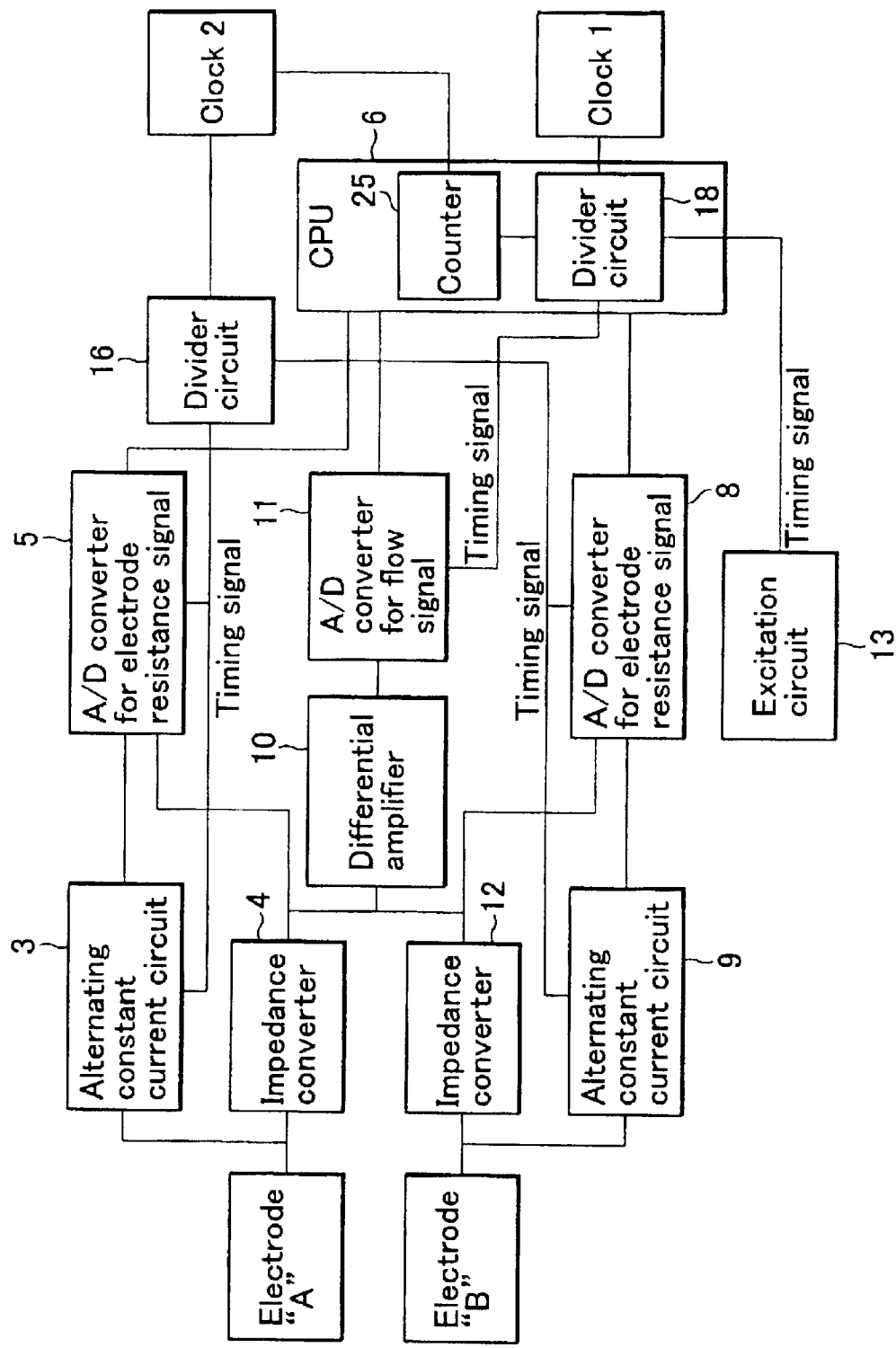
FIG. 13 is a block diagram for a variation of embodiment 2.

FIG. 12 and FIG. 13 show block diagrams for the second embodiment of the present invention. FIG. 13 is an example of a variation of the system shown in FIG. 12. FIG. 14 shows the timing chart for that diagram. In the configurations shown in FIG. 12 and FIG. 13, the same reference numbers are given to the same blocks as those in FIG. 1. In addition, in FIG. 12 and FIG. 13, since pipe P to which electrodes A and B are connected and earth electrode Z also have the same configuration as those in FIG. 1, their indication is omitted.

In the block diagram of FIG. 12, the clock for the diagnosis circuit and the clock for the flow signal detection circuit are separated from each other (clock 1 and clock 2). In other words, each clock signal (clock 1 and clock 2) is divided by using two divider circuits 16 and 18. This may also be carried out by selecting the frequency as the timing when the clock divided from the same clock signal (clock 1) of CPU 6 is given to the diagnosis circuit to a value which is not an integer multiple of the excitation frequency.

Then, the signal value of the diagnosis circuit is made zero in a sampling interval by setting the sampling time for the flow signal to be an integer multiple of the diagnosis circuit signal period. This prevents the above-described diagnosis circuit signal from influencing the flow signal.

In FIG. 12, the sampling time for the flow signal is determined based on the value of clock 2 known in advance. A problem of this method is that, if the clock signal varies with temperature, the sampling time for the flow signal does not become an integer multiple of the diagnosis circuit signal frequency and thus the flow signal is influenced.

To avoid this, using the configuration shown in FIG. 13, the frequency of the clock signal (clock 2) is measured with counter 25 of CPU 6 and the sampling time of the flow signal is determined based on the measured frequency value. This enables the sampling time of the flow signal to be an integer multiple of the diagnosis circuit signal period without fail. In addition, since selection of the frequency for the diagnosis circuit divided from the same clock (clock 2) of CPU 6 to a value which does not become an integer multiple of the fundamental excitation frequency enables the sampling time to be determined from the same clock signal (clock 2), the sampling time is not affected by temperature changes of the clock frequency. For this reason, the sampling time of the flow signal can be an integer multiple of the diagnosis circuit signal period without fail.

Embodiment 3

Next, the diagnosing signal sampling will be described for single frequency excitation and dual frequency excitation.

The above-described embodiment 1 and embodiment 2 are the embodiments for single frequency excitation and, in the signal waveforms detected with electrodes A and B in diagnostic operation, the diagnosing signal components and differential noise components are included as shown in FIG. 15. Accordingly, the diagnosing signal frequency is designed to set to four times or more the excitation frequency and, as shown in FIG. 15, the diagnosing signal is sampled at the latter half of the excitation current waveform where differential noise is smaller, in order to reduce the influence of differential noise.

Next, the mode of measuring the conductivity will be described. A frequency on the border of linear region A and circular arc region B of the Cole-Cole plot shown in FIG. 10 in embodiment 1 of the present invention varies with the conditions between electrodes A and B and the fluid. In this mode of working, fluid resistance is measured alternately using at least two kinds of frequency in embodiment 1 of the present invention. If those resistance values agree with each other in a prescribed range, measurement is regarded as being performed in the linear region and conductivity measurement in the vicinity of the excitation frequency is judged to be carried out without problem. If those resistance values do not agree with each other, that is, are beyond the prescribed range, measurement is regarded as being done in the circular arc region of the Cole-Cole plot and conductivity measurement in the vicinity of the excitation frequency is judged to be not normally carried out.

From this judgment, the frequency on the border of the linear region and circular arc region of the Cole-Cole plot is detected and the diagnosing signal frequency is selected so that the fluid resistances by the diagnosing signal agree with the fluid resistance in the linear region.

Next, diagnosis when the present invention is applied to an electromagnetic flowmeter employing dual frequency excitation will be described using FIG. 16.

First, excitation and flow signals (excitation current waveforms) are synchronized with the diagnosing signal (diagnosing signal waveforms). Then, the frequency for diagnosis timing applied to the diagnosing signal (diagnosing signal waveform) is set as an intermediate frequency between the high frequency (H) and low frequency (L) in excitation current waveforms configured with two frequencies. Detection of the diagnosing signal, that is, the timing for diagnosing signal sampling, is selected to be an even-number multiple of the low frequency (L) as well as to (1/an even number) of the high frequency (H), and thus the diagnosing signal sampling is carried out at the latter half of the low frequency wave period where differential noise decreases sufficiently.

Either (a) a sampling interval of one period of high frequency (H) for removing the influence of high frequency (H) differential noise components (diagnosing signal sampling (1)), or (b) sampling at the latter half portion of the excitation frequency where the influence of high frequency (H) differential noise becomes small (diagnosing signal sampling (2)), is employed while removing the influence of low frequency (L) differential noise components. Either of the above sampling timing intervals may be adopted.

Embodiment 4

FIG. 17 shows an example of application for monitoring the amount of earth and sand using an electromagnetic flowmeter to which the present invention is applied.

In FIG. 17(a), a constant current circuit in an electromagnetic flowmeter is indicated. This constant current circuit is the same as the constant current circuit shown in FIG. 3 and so in FIG. 17, conductivity for an electromagnetic flowmeter is also measured using constant current circuit 30. In addition, an AC signal should be used because of the problem of electrode polarization voltage. Other elements such as impedance converter 32 act in the same manner as in the circuit of FIG. 3.

In FIG. 17(a), as described above, the conductivity of fluid to be measured is calculated based on diagnostic operation of the electrodes. In other words, the amount of earth and sand is estimated from the conductivities between electrodes A and a and earth electrode Z. Since conductivity decreases depending on the amount of deposited earth and sand while the conductivity of tap water ranges from 100 to 200 $\mu$S/cm, the present invention can be applied, for example, to facilities or installations of feed-water or waste-water for agricultural water, dams, rivers, lakes, swamps, etc. by measuring the conductivity of the fluid to be measured. Usually in such applications, the amount of earth and sand is measured by installing densitometers or the like in addition to flowmeters. However, according to the present invention, densitometers are not necessary; the flow or amount of earth and sand can be measured with electromagnetic flowmeters alone.

Further, constant current circuit 30 may be provided with switch 34 to stop its operation so that it can be driven externally with batteries. This makes its intermittent operation possible.

Furthermore, as shown in FIG. 17(b), the output of electromagnetic flowmeters is an analog value of flow output and this estimated amount of earth and sand is also an analog value. Accordingly, the outputs may be transmitted from instrument (electrode assemblies of an electromagnetic flowmeter) 100 to a large control system or to a small computer system 300 such as a personal computer to be connected to an upper-level system via communication unit 200 by using wireless communication without the addition of cables.

In embodiment 1 of the present invention, AC signals are employed as a means to detect the adhesion status inside the pipe and fluid conductivity; a frequency of an integer multiple of the fundamental excitation frequency is adopted as the signal frequency for the constant current supply; the excitation frequency is synchronized with the signal frequency for the adhesion detection circuit; a frequency that is not affected by the structural dispersion of electrodes is selected; and further the electrode impedance measuring circuit is provided.

This enables the electrode impedance to be accurately measured by measuring the electrode impedance in the vicinity of the excitation frequency. As a result, adhesion detection and discrimination of the type of fluid can be accurately carried out. In addition, since a frequency higher than the fundamental excitation frequency is employed, a diagnosis circuit can be obtained, which is not easily affected by fluid noise and in which the flow signal measuring circuit and the electrode impedance measuring circuit do not interfere with each other.

Further, the state of stagnation of the fluid to be measured in electrode portions can be discriminated by operating the diagnosis circuit when the pipe is empty.

According to embodiment 2 of the present invention, AC signals are employed as a means to detect the adhesion status inside the pipe and fluid conductivity; a frequency that is not an integer multiple of the fundamental excitation frequency is selected as the frequency of that AC signal; and a frequency that is not affected by the structural dispersion of electrodes is selected as the AC signal. In addition, the above-described AC signal is devised not to affect the flow signal by providing an electrode impedance measuring circuit and setting the sampling time for the flow signal to be an integer multiple of the period of the aforementioned AC signal.

For this reason, an electromagnetic flowmeter can be realized, which can accurately measure the electrode impedance by measuring the electrode impedance in the vicinity of the excitation frequency and can carry out detection of adhesion and discrimination of the type of fluid accurately. The present invention also offers an electrode impedance measuring circuit that is not easily affected by fluid noise, and enables a flow signal measuring circuit and electrode impedance measuring circuit that do not interfere with each other to be formed.

According to the diagnosing signal sampling method shown in embodiment 3 of the present invention, an electromagnetic flowmeter can be obtained, in which the influence on the diagnosing signal caused by differential noise is made small by employing a system using dual frequency excitation. In addition, since fluid resistance measurement is carried out with two or more frequencies alternately in conductivity measurement and thus the linear region of the Cole-Cole plot is discriminated through whether the resistance values are in a prescribed range or not, the frequency of the diagnosing signal can be selected so that the fluid resistances measured by the diagnosing signal agree with the fluid resistance obtained using the excitation frequencies.

According to embodiment 4 of the present invention, since it is devised that the amount of earth and sand in the fluid to be measured is monitored by measuring conductivity, the amount of earth and sand can be estimated more cheaply than the case where the amount of earth and sand is measured by means of density determination by installing a densitometer.

What is claimed is:

1. An electromagnetic flowmeter provided with a pipe through which the fluid to be measured is passed, that applies a magnetic field to said fluid driving the excitation coils with an excitation circuit, and thereby measures the flow rate of the fluid passing through said pipe, comprising:
   a pair of detecting electrodes to detect a flow signal corresponding to the flow rate of the fluid passing through said pipe,
   an earth electrode whose potential is the reference potential at the time of flow rate measurement,
   diagnosing signal generators that apply diagnosing signals between said detecting electrodes and said earth electrode, and
   a diagnosis circuit to detect resistance values between said detecting electrodes and said earth electrode as diagnostic signals,
   wherein said diagnosing signal generators use alternating signals whose frequency is an integer multiple of the excitation frequency used in said excitation circuit, and
   wherein said diagnosis circuit synchronizes said excitation frequency with said diagnostic signal frequency.

2. An electromagnetic flowmeter in accordance with claim 1, wherein said diagnosing signal generators are constant current supplies.

3. An electromagnetic flowmeter in accordance with claim 1, wherein said diagnosing signal generators are constant voltage supplies.

4. An electromagnetic flowmeter in accordance with claim 1, wherein said diagnosing signal generators select the frequency of said alternating signal to be generated in the range that the rotators of each dipole forming capacitances constructed with said detecting electrodes and said fluid interface can keep track of said alternating signal.

5. An electromagnetic flowmeter in accordance with any of claims 1 to 3, wherein said diagnosing signal generators apply said identical alternating signals to a pair of detecting electrodes as said diagnosing signals.

6. An electromagnetic flowmeter in accordance with any of claims 1 to 3, wherein said electromagnetic flowmeter is small, in which the distance between detecting electrodes is small, and said diagnosing signal is applied alternately to each electrode.

7. An electromagnetic flowmeter in accordance with any of claims 1 to 3, wherein said diagnosis circuit makes the sampling time of the flow signal be "1/(an integer multiple of said alternating signal frequency)" when said alternating signal frequency is an odd-number multiple of said excitation frequency.

8. An electromagnetic flowmeter in accordance with any of claims 1 to 3, wherein said diagnosis circuit calculates the fluid conductivity using measured resistance values of said detecting electrodes.

9. An electromagnetic flowmeter in accordance with any of claims 1 to 3, wherein said diagnosis circuit detects the status of insulating materials adhering to said detecting electrodes using said measured detecting electrode resistance values.

10. An electromagnetic flowmeter in accordance with any of claims 1 to 3, wherein said diagnosis circuit is provided with an analog output and a wireless communication output that transmit measured resistance and fluid conductivity values to an upper-level distributed control system or a personal computer.

11. An electromagnetic flowmeter in accordance with any of claims 1 to 3, wherein said each constant current supply possesses both an AC constant current circuit and a DC constant current circuit.

12. An electromagnetic flowmeter in accordance with claim 11, wherein a signal based on the DC constant current supplies is used for empty pipe detection.

13. An electromagnetic flowmeter in accordance with any of claims 1 to 3, wherein said diagnosis circuit applies diagnosing signals between said detecting electrodes and said earth electrode when said pipe is empty and detects deterioration of insulation at said detecting electrodes using the diagnostic signal thereof.

14. An electromagnetic flowmeter provided with a pipe through which the fluid to be measured is passed, that applies a magnetic field to said fluid driving the excitation coils with an excitation circuit, and thereby measures the flow rate of the fluid passing through said pipe, comprising:
   a pair of detecting electrodes to detect a flow signal corresponding to the flow rate of the fluid passing through said pipe,
   an earth electrode whose potential is the reference potential at the time of flow rate measurement,
   diagnosing signal generators that apply diagnosing signals between said detecting electrodes and said earth electrode, and
   a diagnosis circuit to detect resistance values between said detecting electrodes and said earth electrode as diagnostic signals, wherein said diagnosing signal generators employ a frequency that is not an integer multiple of and is higher than said excitation frequency.

15. An electromagnetic flowmeter in accordance with claim 14, wherein said diagnosis circuit employs the time of "1/(an integer multiple of said alternating signal frequency)" as the sampling time of the flow signal.

16. An electromagnetic flowmeter in accordance with claim 16 or claim 15, wherein the sampling timing for the flow signal and said alternating signal frequency are derived from the same clock.

17. An electromagnetic flowmeter in accordance with claim 16 or claim 15, wherein the sampling timing for the flow signal and said alternating signal frequency are derived from separate clocks and the sampling time is calculated by counting the frequency of said alternating signal and using the frequency thereof.

18. An electromagnetic flowmeter in accordance with claim 14, wherein said diagnosing signal generators generate frequencies in the range that the rotator of dipoles forming capacitances constructed by said detecting electrodes and the interface of the fluid can keep track of said frequencies.

19. An electromagnetic flowmeter in accordance with any of claims 14 or 15, wherein said constant current supplies apply said identical alternating signals to a pair of detecting electrodes as said diagnosing signal.

20. An electromagnetic flowmeter in accordance with claim 14, wherein the flowmeter is small, in which the distance between said detecting electrodes is small, and is devised to pass a current to each electrode alternately.

21. An electromagnetic flowmeter in accordance with any of claims 1 to 3 wherein said diagnosis circuit sets the frequency of said diagnosing signal to four times or more said excitation frequency and said diagnostic signal is sampled at the latter half of the excitation waveforms.

22. An electromagnetic flowmeter in accordance with any of claims 1 to 3, wherein said diagnosis circuit is provided with an adhesion diagnosis circuit that can alternately determine the fluid resistance values using at least two frequencies of said alternating signal, discriminate the linear portion of the Cole-Cole plot based on said resistance values, and select the frequency of said diagnostic signal so that said resistance values determined by said diagnosing signal agree with said resistance value at said excitation frequency.

23. An electromagnetic flowmeter in accordance with any of claims 1 to 3, using the dual-frequency excitation system that applies a magnetic field to said fluid by driving said excitation coils employing two excitation frequencies through said excitation circuit, and provided with a means that synchronizes the excitation signal and said flow signal with said diagnosing signal, a means that make the frequency of said diagnosing signal be an intermediate frequency between the high and low frequencies of said two excitation frequencies, and a means that sets said diagnosing signal frequency as an even-number multiple of said low frequency and also sets said diagnosing signal frequency as 1/(an even number) of said high frequency;

further comprising an adhesion diagnosis circuit in which the low frequency differential noise components are removed at the latter half of said low frequency period for the sampling of said diagnosing signal and the sampling interval is composed of the time for one period of said high frequency, in which the influence of high frequency noise components is removed, and the latter half of the excitation waveform.

* * * * *